(12) United States Patent
Cole et al.

(10) Patent No.: US 10,228,079 B2
(45) Date of Patent: *Mar. 12, 2019

(54) OCEAN THERMAL ENERGY CONVERSION PIPE CONNECTION

(71) Applicant: The Abell Foundation, Inc., Baltimore, MD (US)

(72) Inventors: Barry R. Cole, Arnold, MD (US); Laurence Jay Shapiro, Fair Lawn, NJ (US); Jonathan M. Ross, Arnold, MD (US)

(73) Assignee: The Abell Foundation, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,993

(22) Filed: May 26, 2017

(65) Prior Publication Data

US 2017/0261126 A1 Sep. 14, 2017

Related U.S. Application Data

(63) Continuation of application No. 14/435,718, filed as application No. PCT/US2013/065098 on Oct. 15, 2013, now Pat. No. 9,664,306.

(Continued)

(51) Int. Cl.
*F16L 1/12* (2006.01)
*F16L 1/20* (2006.01)
(Continued)

(52) U.S. Cl.
CPC ............ *F16L 1/207* (2013.01); *F01K 25/106* (2013.01); *F03G 7/05* (2013.01); *F16L 1/12* (2013.01);
(Continued)

(58) Field of Classification Search
USPC ...................... 405/154.1, 158, 166, 169, 170
See application file for complete search history.

(56) References Cited

U.S. PATENT DOCUMENTS

| 4,234,269 A | 11/1980 | Person |
| 4,497,342 A | 2/1985 | Wenzel et al. |

(Continued)

FOREIGN PATENT DOCUMENTS

| CN | 102844566 | 12/2012 |
| CN | 103154511 | 6/2013 |

(Continued)

OTHER PUBLICATIONS

Notification of Transmittal of the International Search Report and the Written Opinion of the International Searching Authority for PCT/US2013/065098 dated Jan. 21, 2014, 11 pages.

(Continued)

*Primary Examiner* — Sean D Andrish
(74) *Attorney, Agent, or Firm* — Fish & Richardson P.C.

(57) ABSTRACT

A method of assembling a pipe on a water-supported floating platform is provided. The platform includes an open central bay, and a gantry on the platform is arranged so as to surround at least a portion of the bay. The method includes providing a pipe intake assembly and staves on the platform; transferring the pipe intake assembly to the interior space of the bay; assembling the individual staves on the pipe intake assembly in an offset construction; lowering the pipe portion within the bay and into the water until the upper ends of the staves reside within a lower portion of the gantry; increasing the length of the pipe portion by assembling additional staves to the upper ends of the assembled staves; and repeating the step of increasing the length of the portion of the pipe until the pipe has a desired length.

11 Claims, 20 Drawing Sheets

Related U.S. Application Data

(60) Provisional application No. 61/714,528, filed on Oct. 16, 2012.

(51) Int. Cl.

| | | |
|---|---|---|
| *F03G 7/05* | (2006.01) | |
| *F01K 25/10* | (2006.01) | |
| *F16L 1/235* | (2006.01) | |
| *F16L 1/26* | (2006.01) | |
| *F16L 1/15* | (2006.01) | |
| *F16L 9/22* | (2006.01) | |
| *B63B 35/44* | (2006.01) | |

(52) U.S. Cl.
CPC ................ *F16L 1/15* (2013.01); *F16L 1/235* (2013.01); *F16L 1/26* (2013.01); *F16L 9/22* (2013.01); *B63B 2035/4433* (2013.01); *Y02E 10/34* (2013.01)

(56) References Cited

U.S. PATENT DOCUMENTS

| | | | | |
|---|---|---|---|---|
| 9,664,306 B2* | 5/2017 | Cole | ................ | F03G 7/05 |
| 2009/0301088 A1 | 12/2009 | Kuo | | |
| 2010/0275597 A1* | 11/2010 | Kuo | ................ | F16L 1/15 |
| | | | | 60/641.7 |
| 2011/0173978 A1* | 7/2011 | Rekret | ................ | F03G 7/05 |
| | | | | 60/641.7 |
| 2011/0173979 A1 | 7/2011 | Krull | | |
| 2011/0272864 A1 | 11/2011 | Miller | | |
| 2012/0011849 A1 | 1/2012 | Cole et al. | | |

FOREIGN PATENT DOCUMENTS

| | | |
|---|---|---|
| JP | 2010241161 | 10/2010 |
| WO | 2011091295 | 7/2011 |

OTHER PUBLICATIONS

Notification Concerning Transmittal of International Preliminary Report on Patentability (Chapter I of the Patent Cooperation Treaty) for PCT/US2013/065098 dated Apr. 30, 2015, 8 pages.

Partial Supplementary European Search Report for EP 13847378.0, dated Jul. 4, 2016, 6 pages.

Communication under Rule 71(3) EPC in European Application No. 13847378.0, dated Sep. 25, 2017, 87 pages (with English translation).

Japan Office Action in Japanese Application No. 2015-537013, dated Aug. 23, 2017, 24 pages (with English translation).

* cited by examiner

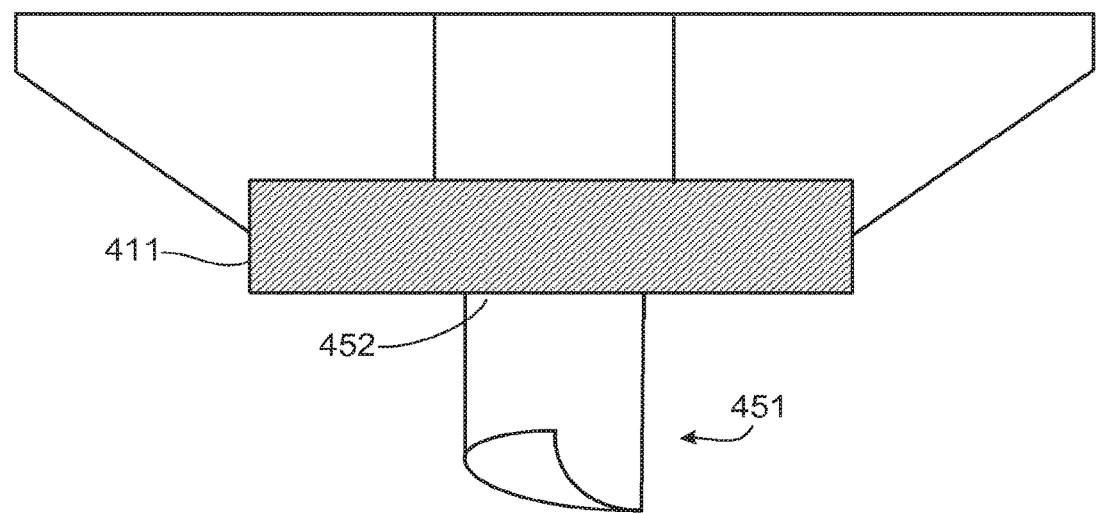
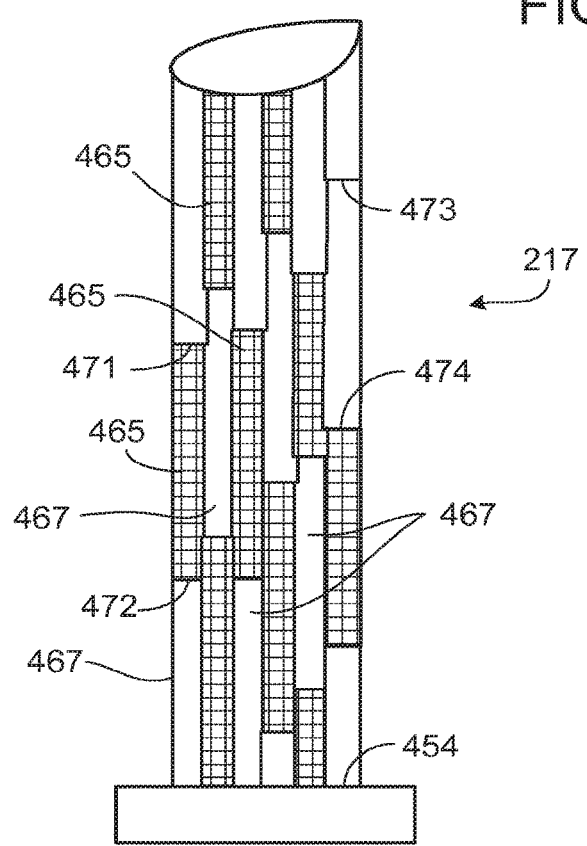
FIG. 4

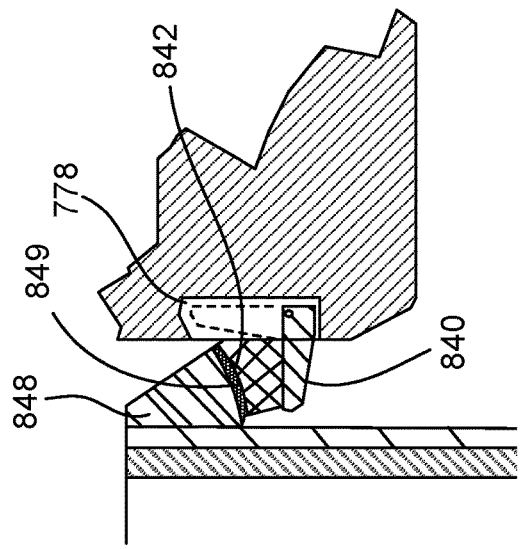
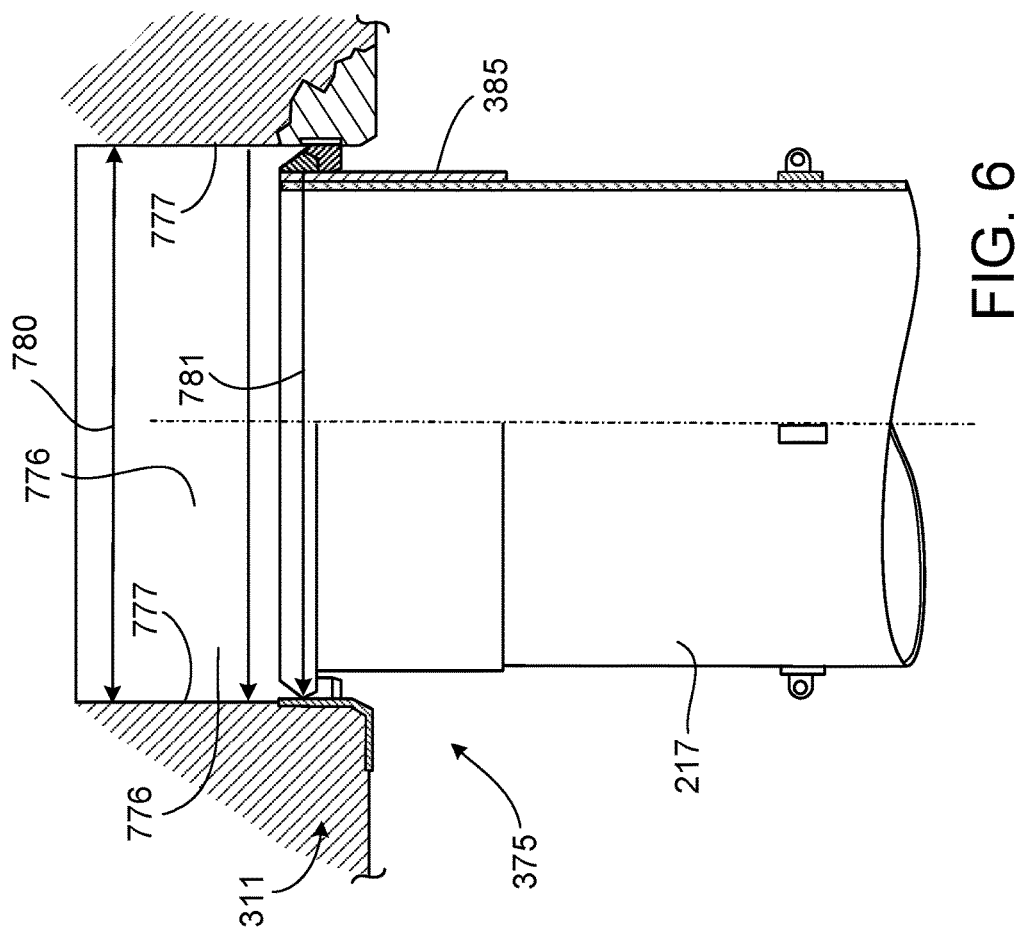
FIG. 7
FIG. 6

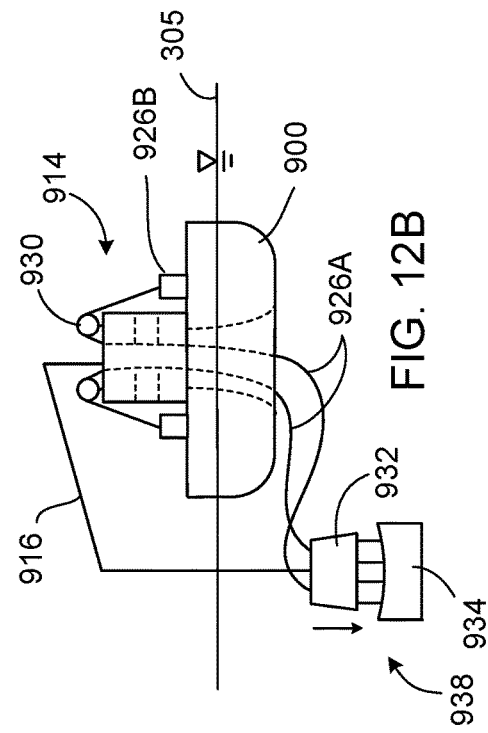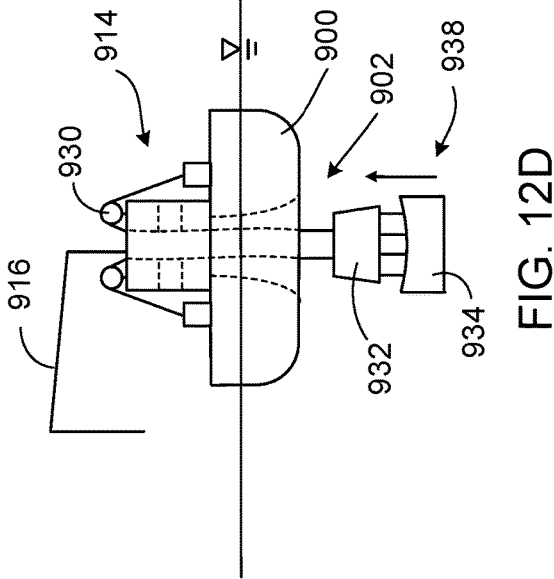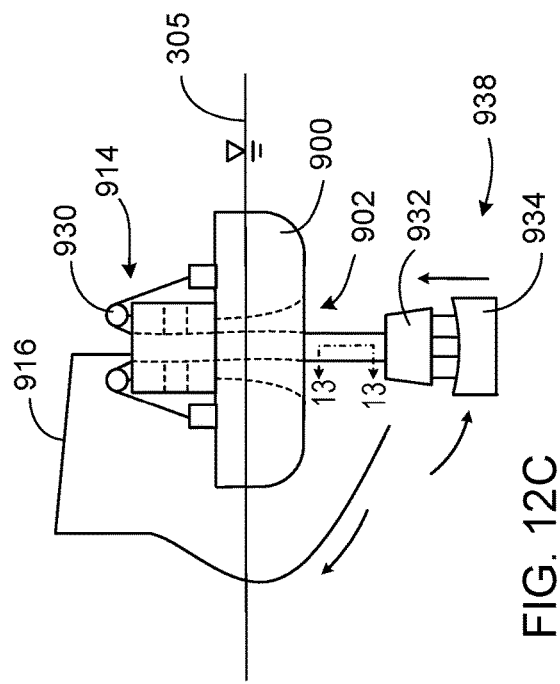

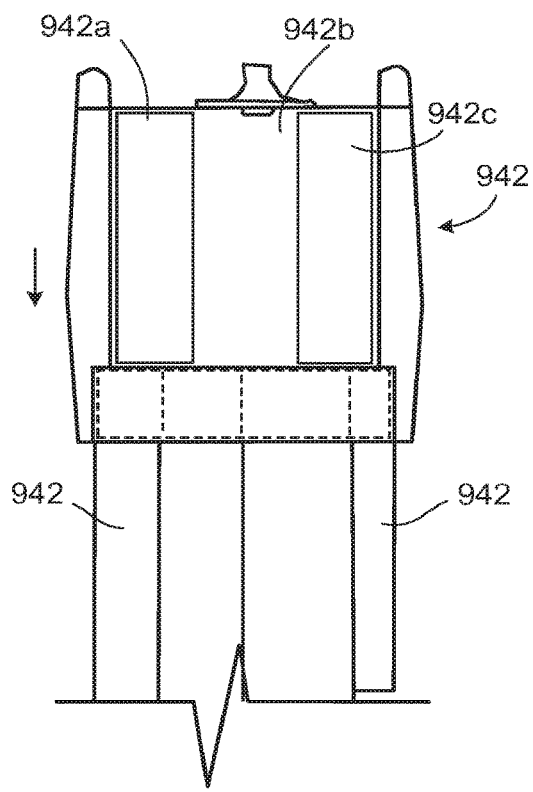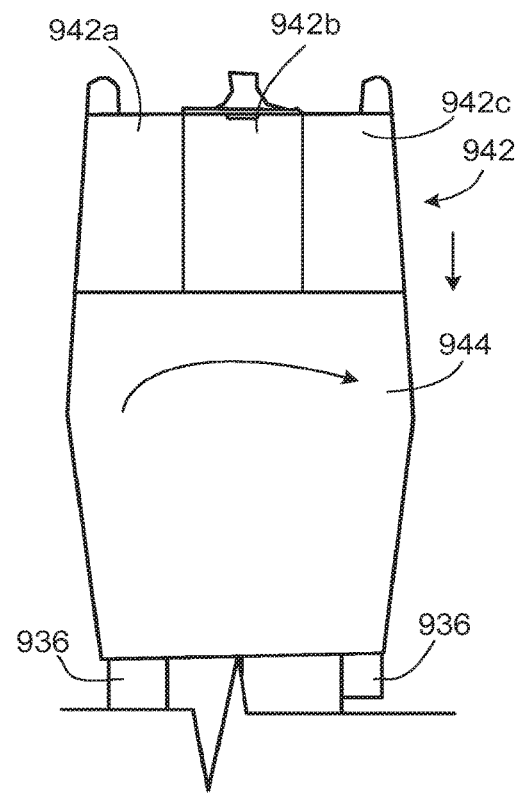
FIG. 14B                    FIG. 14C

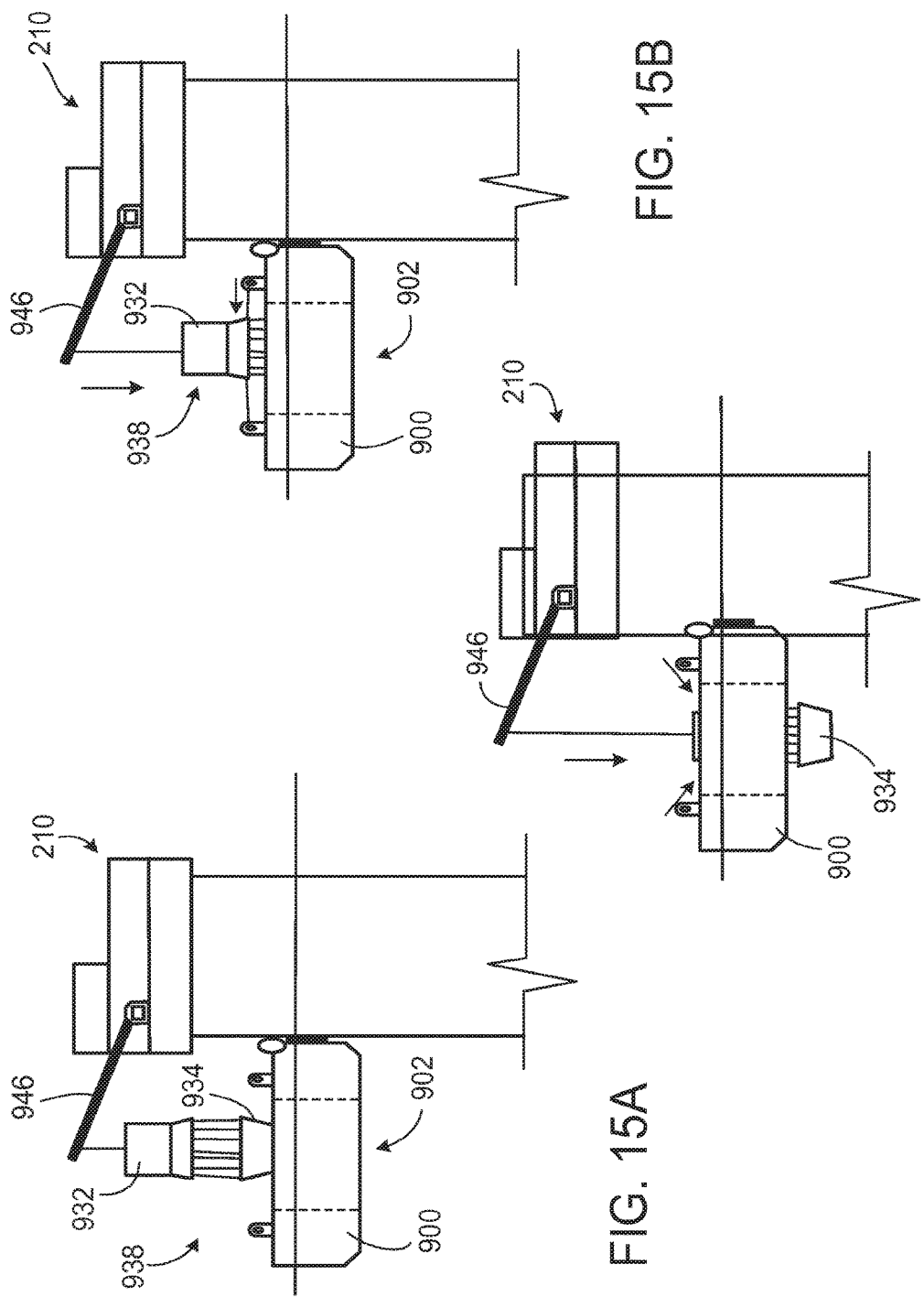

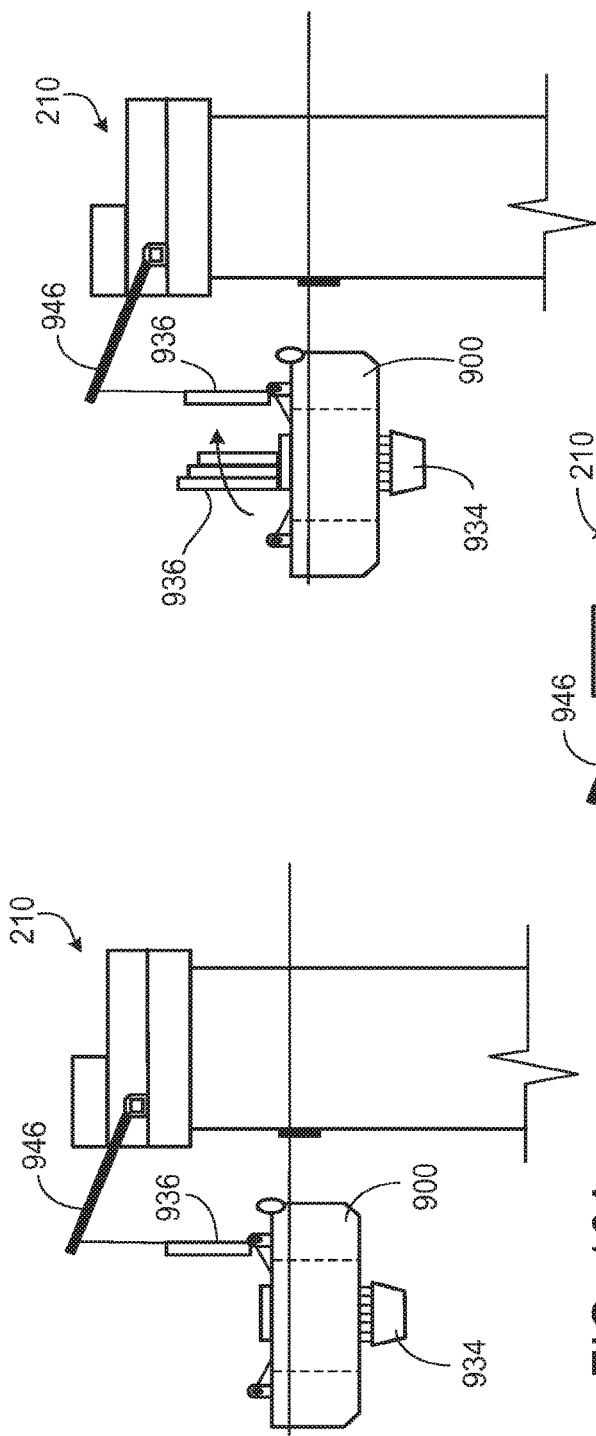

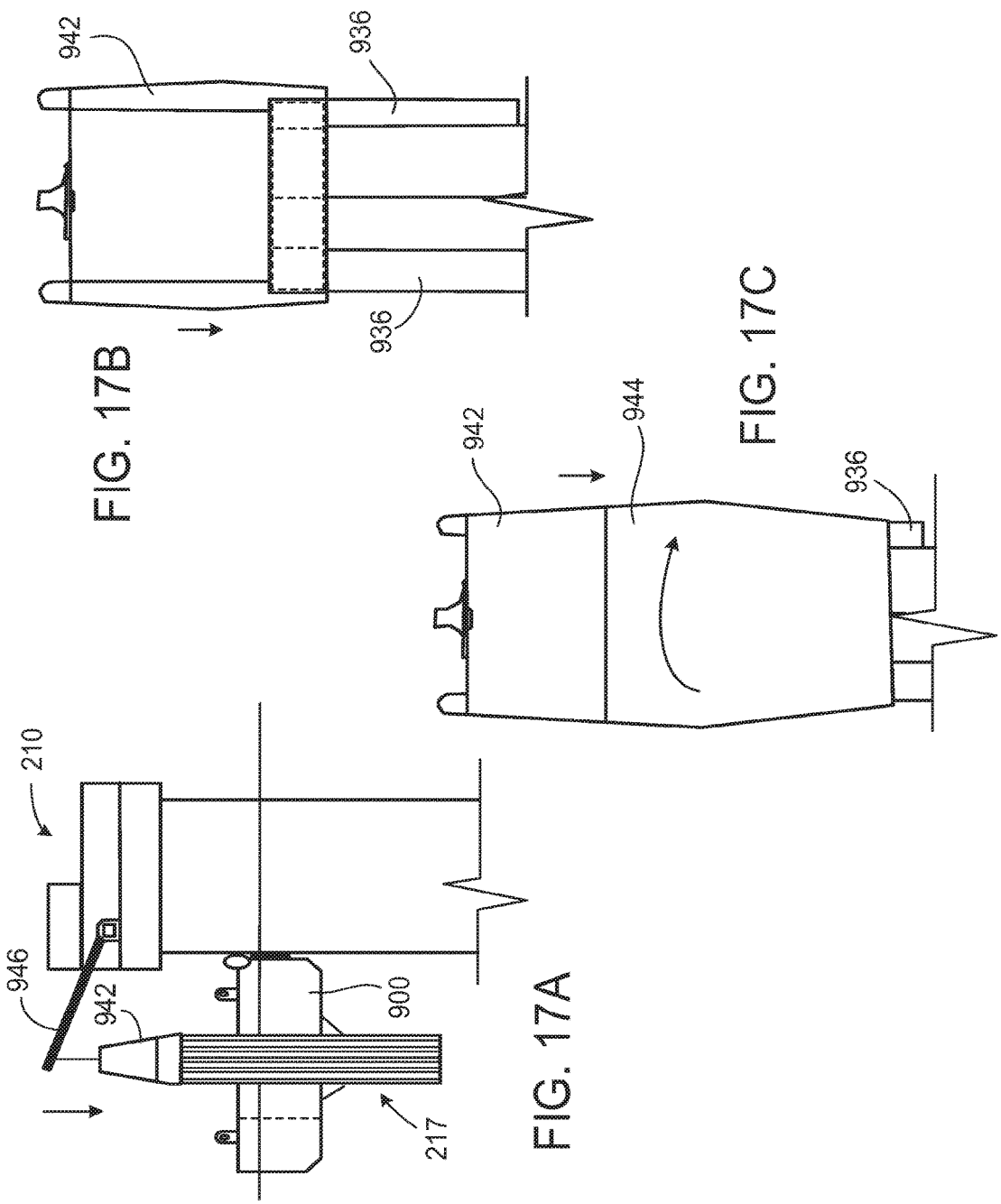

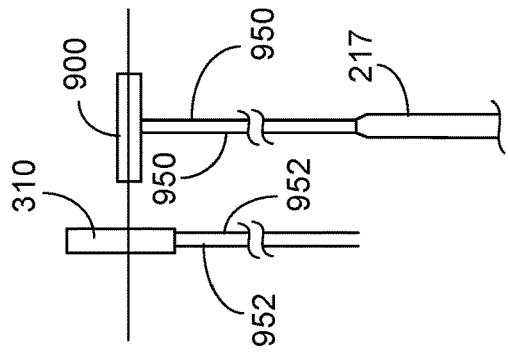
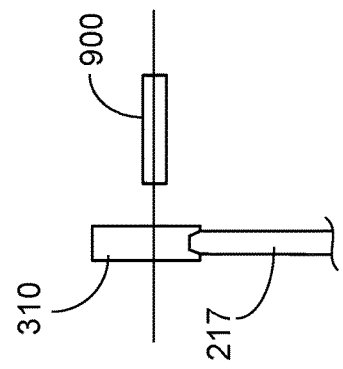
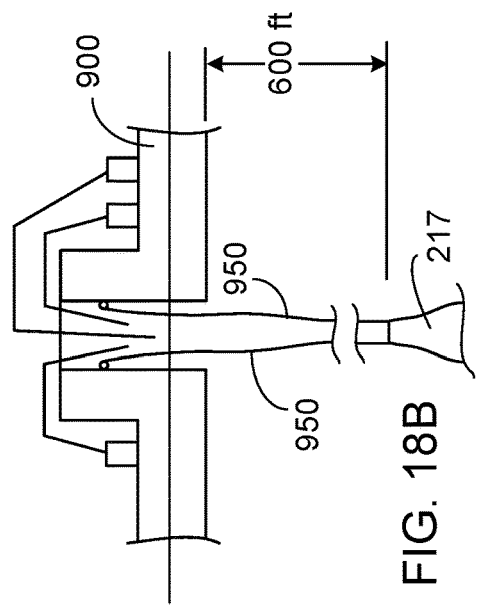
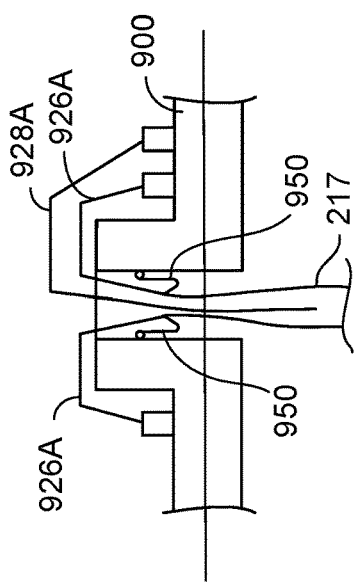
FIG. 18A
FIG. 18B
FIG. 18C
FIG. 18D
FIG. 18E

OCEAN THERMAL ENERGY CONVERSION PIPE CONNECTION

CROSS-REFERENCE TO RELATED APPLICATIONS

This application is a continuation application of and claims priority to U.S. application Ser. No. 14/435,718, filed on Apr. 14, 2015; which is a national stage application under 35 U.S.C. § 371 of International Patent Application No. PCT/US2013/065098, filed on Oct. 15, 2013, which claims the benefit of priority to U.S. Provisional Application No. 61/714,528, filed Oct. 16, 2012. Each application is incorporated herein by reference in their entirety.

TECHNICAL FIELD

This disclosure relates to ocean thermal energy conversion power plants and more specifically to floating, minimum heave platform, multi-stage heat engine, ocean thermal energy conversion power plants.

BACKGROUND

Energy consumption and demand throughout the world has grown at an exponential rate. This demand is expected to continue to rise, particularly in developing countries in Asia and Latin America. At the same time, traditional sources of energy, namely fossil fuels, are being depleted at an accelerating rate and the cost of exploiting fossil fuels continues to rise. Environmental and regulatory concerns are exacerbating that problem.

Solar-related renewable energy is one alternative energy source that may provide a portion of the solution to the growing demand for energy. Solar-related renewable energy is appealing because, unlike fossil fuels, uranium, or even thermal "green" energy, there are few or no climatic risks associated with its use. In addition, solar related energy is free and vastly abundant.

Ocean Thermal Energy Conversion ("OTEC") is a manner of producing renewable energy using solar energy stored as heat in the oceans' tropical regions. Tropical oceans and seas around the world offer a unique renewable energy resource. In many tropical areas (between approximately 20° north and 20° south latitude), the temperature of the surface sea water remains nearly constant. To depths of approximately 100 ft the average surface temperature of the sea water varies seasonally between 75° and 85° F. or more. In the same regions, deep ocean water (between 2500 ft and 4200 ft or more) remains a fairly constant 40° F. Thus, the tropical ocean structure offers a large warm water reservoir at the surface and a large cold water reservoir at depth, with a temperature difference between the warm and cold reservoirs of between 35° to 45° F. This temperature difference remains fairly constant throughout the day and night, with small seasonal changes.

The OTEC process uses the temperature difference between surface and deep sea tropical waters to drive a heat engine to produce electrical energy. OTEC power generation was identified in the late 1970's as a possible renewable energy source having a low to zero carbon footprint for the energy produced. An OTEC power plant, however, has a low thermodynamic efficiency compared to more traditional, high pressure, high temperature power generation plants. For example, using the average ocean surface temperatures between 80° and 85° F. and a constant deep water temperature of 40° F., the maximum ideal Carnot efficiency of an OTEC power plant will be 7.5 to 8%. In practical operation, the gross power efficiency of an OTEC power system has been estimated to be about half the Carnot limit, or approximately 3.5 to 4.0%. Additionally, analysis performed by leading investigators in the 1970's and 1980's, and documented in "Renewable Energy from the Ocean, a Guide to OTEC" William Avery and Chih Wu, Oxford University Press, 1994 (incorporated herein by reference), indicates that between one quarter to one half (or more) of the gross electrical power generated by an OTEC plant operating with a ΔT of 40° F. would be required to run the water and working fluid pumps and to supply power to other auxiliary needs of the plant. On this basis, the low overall net efficiency of an OTEC power plant converting the thermal energy stored in the ocean surface waters to net electric energy has not been a commercially viable energy production option.

An additional factor resulting in further reductions in overall thermodynamic efficiency is the loss associated with providing necessary controls on the turbine for precise frequency regulation. This introduces pressure losses in the turbine cycle that limit the work that can be extracted from the warm sea water.

This low OTEC net efficiency compared with efficiencies typical of heat engines that operate at high temperatures and pressures has led to the widely held assumption by energy planners that OTEC power is too costly to compete with more traditional methods of power production.

Indeed, the parasitic electrical power requirements are particularly important in an OTEC power plant because of the relatively small temperature difference between the hot and cold water. To achieve maximum heat transfer between the warm sea water and the working fluid, and between the cold sea water and the working fluid large heat exchange surface areas are required, along with high fluid velocities. Increasing any one of these factors can significantly increase the parasitic load on the OTEC plant, thereby decreasing net efficiency. An efficient heat transfer system that maximizes the energy transfer in the limited temperature differential between the sea water and the working fluid would increase the commercial viability of an OTEC power plant.

In addition to the relatively low efficiencies with seemingly inherent large parasitic loads, the operating environment of OTEC plants presents design and operating challenges that also decrease the commercial viability of such operations. As previously mentioned, the warm water needed for the OTEC heat engine is found at the surface of the ocean, to a depth of 100 ft or less. The constant source of cold water for cooling the OTEC engine is found at a depth of between 2700 ft and 4200 ft or more. Such depths are not typically found in close proximity to population centers or even land masses. An offshore power plant is required.

Whether the plant is floating or fixed to an underwater feature, a long cold water intake pipe (CWP) of 2000 ft or longer is required. Moreover, because of the large volume of water required in commercially viable OTEC operations, the cold water intake pipe requires a large diameter (typically between 6 and 35 feet or more). Suspending a large diameter pipe from an offshore structure presents stability, connection and construction challenges which have previously driven OTEC costs beyond commercial viability.

Additionally, a pipe having significant diameter to length ratio that is suspended in a dynamic ocean environment can be subjected to temperature differences and varying ocean currents along the length of the pipe. Stresses from bending and vortex shedding along the pipe also present challenges.

Surface influences such as wave action present further challenges with respect to the connection between the pipe and floating platform due to the relative motion between pipe and floating platform at the connection. A cold water pipe intake system having desirable performance, connection, and construction consideration would increase the commercial viability of an OTEC power plant.

Environmental concerns associated with an OTEC plant have also been an impediment to OTEC operations. Traditional OTEC systems draw in large volumes of nutrient rich cold water from the ocean depths and discharge this water at or near the surface. Such discharge can effect, in a positive or adverse manner, the ocean environment near the OTEC plant, impacting fish stocks and reef systems that may be down current from the OTEC discharge.

SUMMARY

Aspects of the present disclosure are directed to a power generation plant utilizing ocean thermal energy conversion processes.

An offshore OTEC power plant has improved overall efficiencies with reduced parasitic loads, greater stability, lower construction and operating costs, and improved environmental footprint. Other aspects include large volume water conduits that are integral with the floating structure. Modularity and compartmentation of the multi-stage OTEC heat engine reduces construction and maintenance costs, limits off-grid operation and improves operating performance. Still further aspects provide for a floating platform having integrated heat exchange compartments and provides for minimal movement of the platform due to wave action. The integrated floating platform may also provide for efficient flow of the warm water or cool water through the multi-stage heat exchanger, increasing efficiency and reducing the parasitic power demand. Aspects of the systems and methods described can promote an environmentally neutral thermal footprint by discharging warm and cold water at appropriate depth/temperature ranges. Energy extracted in the form of electricity reduces the bulk temperature to the ocean.

Still further aspects of the systems and methods described relate to a cold water pipe for use with an offshore OTEC facility, the cold water pipe being an offset staved, continuous pipe.

One aspect relates to a pipe that comprises an elongated tubular structure having an outer surface, a top end and a bottom end. The tubular structure comprises a plurality of first and second staved segments, each stave segment has a top portion and a bottom portion, wherein the top portion of the second stave segment is offset from the top portion of the first staved segment. The only exceptions are at the very top and bottom of the CWP, where the ends of those staves form a flush surface (no offsets) suitable for mating with the interconnection with the platform and with the bottom section of the CWP.

A further aspect relates to a pipe comprising a ribbon or a strake at least partially wound around the pipe in a diagonal fashion on the outside surface of the tubular structure. The ribbon or strake can be circumferentially wound around the outer surface of the top portion of the pipe, the middle portion of the pipe, or the lower portion of the pipe. The ribbon or strake can be circumferentially wound around the entire length of the pipe. The ribbon or strake can be attached so as to lay substantially flat against the outer surface of the pipe. The ribbon or strake can be attached so as to protrude outwardly from the outer surface of the pipe. The ribbon or strake can be made of the same or different material as the pipe. The ribbon or strake can be adhesively bonded to the outer surface of the pipe, mechanically bonded to the outer surface of the pipe, or use a combination of mechanical and adhesive bonds to attach to the outer surface of the pipe. The ribbon or strake may have holes or gaps that permit partial flow of water or enable the passage of piping or cabling or other structural aspects of the OTEC plant, or avoid weld crowns. The ribbon or strake may consist of a single continuous ribbon or strake, separate segments with gaps, or parallel ribbons or strakes. Their diagonal angle of the ribbon or strake with respect to the platform vertical may be constant (forming a helix) or may vary.

Further aspects of the systems and methods described relate to an offset staved pipe wherein each stave segment further comprises a tongue on a first side and a groove on a second side for mating engagement with an adjacent stave segment. The offset stave pipe can include a positive locking system to mechanically couple a first side of one stave to the second side of a second stave. Staves can be joined vertically from the top portion of one stave to the bottom portion of an adjacent stave using biscuit joinery. In an alternative embodiment, the top portion of a stave and the bottom portion of a stave can each include a joining void, such that when the top portion of a first stave is joined with the bottom portion of a second stave, the joining voids align to form a continuous cavity or virtual pipe. A flexible resin can be injected into the open end of the aligned joining voids and flow into and fill the entire void and thus provide adhesion between staves. The flexible resin can be used to fill gaps in any joined surfaces. In aspects of the disclosure the flexible resin is a methacrylate adhesive.

Individual staves of the current systems and methods described can be of any length. In some embodiments, each stave segment is between 20 feet and 90 feet measured from the bottom portion to the top portion of the stave. Stave segments can be sized to be shipped by standard inter-modal container. Individual stave segments can be between 10 inches and 80 inches wide. Each stave segment can be between 1 inch and 24 inches thick.

Stave segments can be pulltruded, extruded, or molded. Stave segments can comprise polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyester, fiber reinforced polyester, vinyl ester, reinforced vinyl ester, concrete, ceramic, or a composite of one or more thereof.

In further aspects of the systems and methods described, a stave segment can comprise at least one internal void. At least one void can be filled with water, polycarbonate foam, or syntactic foam or other devices or materials that provide separation between the inner and outer walls of the stave, and can also provide additional strength to the stave in the longitudinal, lateral, circumferential or other direction. In aspects of the systems and methods described, the pipe is a cold water intake pipe for an OTEC power plant.

A still further aspect of the systems and methods described relates to an offshore power generation structure comprising a submerged portion, the submerged portion further comprises: a heat exchange portion; a power generation portion; and a cold water pipe comprising a plurality of offset first and second stave segments.

Yet another aspect of the systems and methods described relates to a method of forming a cold water pipe for use in an OTEC power plant, the method comprises: forming a plurality of first and second stave segments joining alternating first and second stave segments such that the second stave segments are offset from the first stave segments to form a continuous elongate tube.

A further aspect of the systems and methods described relates to a submerged vertical pipe connection comprising: a floating structure having a vertical pipe receiving bay, wherein the receiving bay has a first diameter; a vertical pipe for insertion into the pipe receiving bay, the vertical pipe having a second diameter smaller than the first diameter of the pipe receiving bay; a partially spherical or arcuate bearing surface; and one or more movable detents, pinions or lugs operable with the bearing surface, wherein the detents define a diameter that is different than the first or second diameter when in contact with the bearing surface.

An additional aspect of the systems and methods described relates to a method of connecting a submerged vertical pipe to a floating platform comprising: providing a floating structure having a vertical pipe receiving bay, wherein the pipe receiving bay has a first diameter, providing a vertical pipe having a top end portion that has a second diameter that is less than the first diameter; inserting the top end portion of the vertical pipe into the receiving bay; providing a bearing surface for supporting the vertical pipe; extending one or more detents such that the one or more detents have a diameter that is different from the first or second diameters; contacting the one or more detents with the bearing surface to suspend the vertical pipe from the floating structure.

In aspects of the systems and methods described, the one or more detents can be integral to the vertical pipe. The one or more detents can be integral to the receiving bay. The one or more detents comprise a first retracted position that defines a diameter less than the first diameter. The one or more detents comprise an extended position that defines a diameter greater than the first diameter. A bearing surface is integral to the pipe receiving bay and operable with the one or more detents. The bearing surface can comprise a spherical bearing surface. The one or more detents further comprise a mating surface configured to contact the bearing surface. The one or more detents further comprise a mating surface configured to contact the spherical bearing surface. The spherical bearing surface and the mating surface facilitate relative motion between the vertical pipe and the floating structure.

In still further aspects, the one or more detents comprise a first retracted position that defines a diameter greater than the second diameter. The one or more detents comprise an extended position that defines a diameter less than the second diameter. A bearing surface is integral to the vertical pipe and operable with the one or more detents.

Features can include a drive for extending or retracting the detents, the drive being a hydraulically controlled drive, a pneumatically controlled drive, a mechanically controlled drive, an electrically controlled drive, or an electro-mechanically controlled drive, or any combination of these.

Further aspects can include a pipe receiving bay including a first angled pipe mating surface; and a vertical pipe comprising a second angled pipe mating surface, wherein the first and second angled pipe mating surfaces are configured to cooperatively guide the vertical pipe during insertion of the vertical pipe into the pipe receiving bay.

An additional aspect of the systems and methods described relates to a method of assembling a pipe on a water-supported floating platform that includes an open central bay, and a gantry on the platform arranged so as to surround at least a portion of the bay. The method includes providing a pipe intake assembly on the platform; providing staves on the platform; transferring the pipe intake assembly to the interior space of the bay; transferring individual staves to the bay and assembling the individual staves on the pipe intake assembly in an offset stave construction so as to form an annular pipe portion having a crenellated upper end; lowering the pipe portion within the bay and into the water until the upper ends of the staves reside within a lower portion of the gantry; increasing the length of the pipe portion by assembling additional staves to the upper ends of the staves that form the pipe portion; and repeating the step of increasing the length of the portion of the pipe until the pipe has a desired length.

The method may include one or more of the following features: Transferring the pipe intake assembly to the interior space of the bay includes lowering the pipe intake assembly over a side of the platform, moving the pipe intake assembly under the platform to a location underlying the bay, and raising the pipe intake assembly up through the bay to a desired location within the gantry. Transferring the pipe intake assembly to the interior space of the bay includes lifting the pipe intake assembly above a surface of the platform; moving the platform so that the pipe intake assembly overlies the bay, and lowering the pipe intake assembly at least partially into the bay. Transferring individual staves to the bay and assembling the individual staves on the pipe intake assembly further includes assembling the individual staves so that the lower end of the annular pipe portion is flush with an upper side of the pipe intake assembly; and joining the lower end of the annular pipe portion to the pipe intake assembly to form the pipe portion, wherein the step of joining includes wrapping a bonding material around the joint between the annular pipe portion and the pipe intake assembly, the bonding material extending circumferentially and overlapping at least a portion of the annular pipe portion and the pipe intake assembly. The pipe intake assembly includes a pipe end and a weight connected to the pipe end. The method further includes the following step once the pipe has reached a desired length: connecting a pipe end to an end of the pipe that is opposed to the pipe intake assembly.

An additional aspect of the systems and methods described relates to a method of assembling a pipe on a water-supported floating platform, including providing the platform including an open central bay, a gantry on the platform, the gantry arranged so as to surround at least a portion of the bay, and a hollow mandrel that is supported by the gantry at a location overlying the bay; providing staves on the platform; providing a bell mouth assembly that includes a bell mouth and a weight, the bell mouth having a first side and a second side that is opposed to the first side, wherein the weight is connected to the second side of the bell mouth; positioning the bell mouth assembly within the bay in such a way that the first side of the bell mouth resides above an upper surface of the platform and adjacent to the mandrel; arranging staves in the mandrel so as to form a staggered ring of staves in which first ends of each stave arranged in the staggered ring are formed flush against the first side of the bell mouth, and second ends of each stave are offset relative to the adjacent staves; joining the staggered ring of staves to the bell mouth assembly to form a portion of the pipe, the step of joining including wrapping a bonding material around the joint between the staggered ring and the bell mouth, the bonding material extending circumferentially and overlapping at least a portion of the staggered ring and the bell mouth; lowering the portion of the pipe into the water until the second ends of the staves of the staggered ring reside within a lower portion of the mandrel; increasing the length of the portion of the pipe including positioning additional staves within the mandrel such that the additional staves are positioned against the mandrel and the first ends of the additional staves abut the second end of a corresponding stave of the staggered ring, and joining the additional staves to the portion of cold water pipe by wrapping the portion of the cold water pipe with bonding material such that the bonding material overlaps at least a portion of the additional staves and the portion of the cold water pipe; and repeating the step of increasing the length of the portion of the pipe until the pipe has a desired length.

The method may include one or more of the following features: arranging staves on the platform in a predetermined order that corresponds to the order in which the individual staves are to be installed. The staves are individually packaged into a corresponding stave alignment jig. Each stave alignment jig includes a lifting eye and a flange, the lifting eye disposed adjacent a first end of the stave alignment jig and the flange disposed adjacent a second end of the stave alignment jig and configured to cooperatively engage pins provided on the gantry. Arranging staves in the mandrel so as to form a staggered ring includes positioning a stave against the mandrel; positioning another stave against both the mandrel and the stave that was positioned immediately-preceding the another stave; repeating the step of positioning another stave step until a ring of staves is formed; and wherein the another stave has a different length than the stave that was positioned immediately-preceding the another stave, and the staves are arranged so that a first end of each stave of the staggered ring lies flush with the first ends of the other staves used to form the staggered ring. Arranging staves in the mandrel so as to form a staggered ring of staves further includes sealing the first ends of the staves used to form the staggered ring. Once the pipe has reached a desired length, connecting a pipe end to an end of the pipe that is opposed to the bell mouth. The pipe end is tapered inward and is configured to be captured in a fitting provided on an underside of a spar. Arranging staves in the mandrel and positioning additional staves within the mandrel further comprise joining adjacent staves to each other. The method further includes providing at least one spreader within the pipe, the spreader is configured to provide an outward force to an inner surface of the pipe. The bell mouth assembly comprises a bell mouth and a weight connected to the bell mouth.

An additional aspect of the systems and methods described relates to a method of assembling a pipe on a water-supported floating platform, including providing the platform including an open central bay and a guide ring arranged on the platform so as to surround the bay; providing a bell mouth assembly that includes a bell mouth and a weight, the bell mouth having a first side and a second side that is opposed to the first side, wherein the weight is connected to the second side of the bell mouth; positioning the bell mouth assembly within the bay in such a way that the first side of the bell mouth resides above an upper surface of the platform and adjacent to the guide ring; arranging staves on the guide ring so as to form a staggered ring of staves in which first ends of each stave arranged in the staggered ring are formed flush against the first side of the bell mouth, and second ends of each stave are offset relative to the adjacent staves; joining the staggered ring of staves to the bell mouth assembly to form a portion of the pipe, the step of joining including wrapping a bonding material around the joint between the staggered ring and the bell mouth, the bonding material extending circumferentially and overlapping at least a portion of the staggered ring and the bell mouth; lowering the portion of the pipe into the water until the second ends of the staves of the staggered ring reside within a lower portion of the mandrel; increasing the length of the portion of the pipe including positioning additional staves within the mandrel such that the additional staves are positioned against the guide ring and the first ends of the additional staves abut the second end of a corresponding stave of the staggered ring, and joining the additional staves to the portion of cold water pipe by wrapping the portion of the cold water pipe with bonding material such that the bonding material overlaps at least a portion of the additional staves and the portion of the cold water pipe; and repeating the step of increasing the length of the portion of the pipe until the pipe has a desired length.

The method may include one or more of the following features: The first side of the bell mouth includes alignment tabs, and the step of arranging staves on the guide ring includes positioning the staves relative to the bell mouth assembly so that a lower end of the stave is aligned with the alignment tab. Before adjacent staves are attached to each other, a bonding material is applied to each stave along the respective attachment surface. Each stave comprises self-retaining mating features along edges that abut adjacent staves.

An additional aspect of the systems and methods described relates to a method of underwater assembly of a pipe to a water-supported floating body that includes a vacancy formed in a submerged surface thereof, including providing the pipe secured to a navigatable water vessel such that the pipe is positioned at least partially within the water with a longitudinal axis of the pipe oriented generally parallel to a vertical axis; securing keeper cables to an upper end of the pipe; lowering the pipe within the water relative to the vessel such that the upper end of the pipe resides at a depth that is lower than the underside of the floating body; securing the upper end of the pipe to support cables that extend from the interior of the vacancy; detaching the keeper cables from the upper end of the pipe; drawing the upper end of the pipe into the vacancy by retracting the support cables into the vacancy; and securing the upper end of the pipe within the vacancy.

The method may include one or more of the following features: The method further includes moving the navigatable water vessel to a location adjacent the floating body. The method further includes providing the navigatable water vessel with an open central bay and lowering cables operable to support objects at various heights within the bay, wherein during the providing the pipe step the pipe is secured to the navigatable water vessel using the lowering cables, and the pipe remains secured to the lowering cables during the step of securing the keeper cables.

Aspects of the systems and methods described may have one or more of the following advantages: a continuous offset staved cold water pipe is lighter than segmented pipe construction; a continuous offset staved cold water pipe has less frictional losses than a segmented pipe; individual staves can be sized for easy transportation to the OTEC plant operational site; staves can be constructed to desired buoyancy characteristics; OTEC power production requires little to no fuel costs for energy production; the low pressures and low temperatures involved in the OTEC heat engine reduce component costs and require ordinary materials compared to the high-cost, exotic materials used in high pressure, high temperature power generation plants; plant reliability is comparable to commercial refrigeration systems, operating continuously for several years without significant maintenance; reduced construction times compared to high pressure, high temperature plants; and safe, environmentally benign operation and power production. Additional advantages may include increased net efficiency compared to traditional OTEC systems, lower sacrificial electrical loads, reduced pressure loss in warm and cold water passages, modular components, less frequent off-grid production time, minimal heave and reduced susceptibility to wave action, discharge of cooling water below surface levels, intake of warm water free from interference from cold water discharge, and customize-able pipe stiffness over the entire length of pipe to match bathymetric current conditions of the operating site.

Cold water pipe assemblies and methods of cold water pipe fabrication and assembly described herein can be used to create strong, relatively lightweight cold water pipes having increased flexibility over certain conventional cold water pipes by creating a composite cold water pipe that is able to transfer loads throughout the pipe. By forming cold water pipes of stave segments using the methods described herein, cold water pipes can be assembled and transported more efficiently and at lower costs by reducing the overall size of the cold water pipe components.

The cold water pipe systems and assembly methods described herein can enable a cold water pipe to be assembled at its location of future use after the floating platform with which the cold water pipe will be used is fully assembled. Such assembly methods typically do not disrupt other OTEC system installation operations. Further, the assembly methods and systems described herein can allow the cold water pipe to be assembled more quickly than some other conventional methods (e.g., in less than a week) and can require less extensive equipment (e.g., without the use of a heavy-lift crane ship or barge). The cold water pipe installation methods can also enable the cold water pipe to be detached and retracted from the spar after installation (e.g., retracted from a receptacle orifice in the bottom of the spar) and retrieved for reuse with another similarly configured OTEC platform when the original spar is taken out of service.

The cold water pipe assembly forms a single, very large diameter pipe. The cold water pipe assembly and installation methods enable the secure joining and bonding of the staves to a pre-fabricated bell mouth at the bottom of the cold water pipe. The flow velocity at the bell mouth opening at the bottom of the cold water pipe helps to keep the intake flow at the cold water pipe inlet to within standards set by some regulatory agencies or governments. For example, in some embodiments, the intake flow is 0.5 feet per second or less, which complies with Section 316(a) of the Federal Water Pollution Control Act of 1972 (Clean Water Act), 33 U.S.C. § 1251.

The details of one or more embodiments are set forth in the accompanying drawings and the description below. Other aspects, features, and advantages of the disclosure will be apparent from the description and drawings, and from the claims.

DESCRIPTION OF DRAWINGS

FIG. 4 illustrates an offset staved pipe of an OTEC structure.
FIG. 6 illustrates a cold water pipe connection.
FIG. 7 illustrates a cold water pipe connection.
FIGS. 12A-12D illustrate lowering a cold water pipe bell mouth into water using a barge crane and transferring the bell mouth to lowering cables of the assembly gantry.
FIGS. 14A-14C illustrate installing a cold water pipe connection on the cold water pipe of FIG. 10.
FIGS. 15A-15C illustrate lowering a cold water pipe bell mouth into water using a platform crane and transferring the bell mouth to a barge.
FIGS. 16A-16C illustrate forming a cold water pipe by assembling stave pipe segments using a platform crane.
FIGS. 17A-17C illustrate installing a cold water pipe connection on the cold water pipe of FIGS. 15A-15C.
FIGS. 18A-18E illustrate detaching the cold water pipe from barge and attaching the cold water pipe to an OTEC structure.

DETAILED DESCRIPTION

This disclosure relates to electrical power generation using Ocean Thermal Energy Conversion (OTEC) technology. Aspects of the disclosure relate to a floating OTEC power plant having improved overall efficiencies with reduced parasitic loads, greater stability, lower construction and operating costs, and improved environmental footprint over previous OTEC power plants. Other aspects include large volume water conduits that are integral with the floating structure. Modularity and compartmentation of the multi-stage OTEC heat engine reduces construction and maintenance costs, limits off-grid operation and improves operating performance. Still further aspects provide for a floating platform having integrated heat exchange compartments and provides for minimal movement of the platform due to wave action. The integrated floating platform may also provide for efficient flow of the warm water or cool water through the multi-stage heat exchanger, increasing efficiency and reducing the parasitic power demand. Aspects of the systems and methods described promote a neutral thermal footprint by discharging warm and cold water at appropriate depth/temperature ranges. Energy extracted in the form of electricity reduces the bulk temperature to the ocean.

OTEC is a process that uses heat energy from the sun that is stored in the Earth's oceans to generate electricity. OTEC utilizes the temperature difference between the warmer, top layer of the ocean and the colder, deep ocean water. Typically this difference is at least 36° F. (20° C.). These conditions exist in tropical areas, roughly between the Tropic of Capricorn and the Tropic of Cancer, or even 20° north and south latitude. The OTEC process uses the temperature difference to power a Rankine cycle, with the warm surface water serving as the heat source and the cold deep water serving as the heat sink. Rankine cycle turbines drive generators which produce electrical power.

Figure 1:
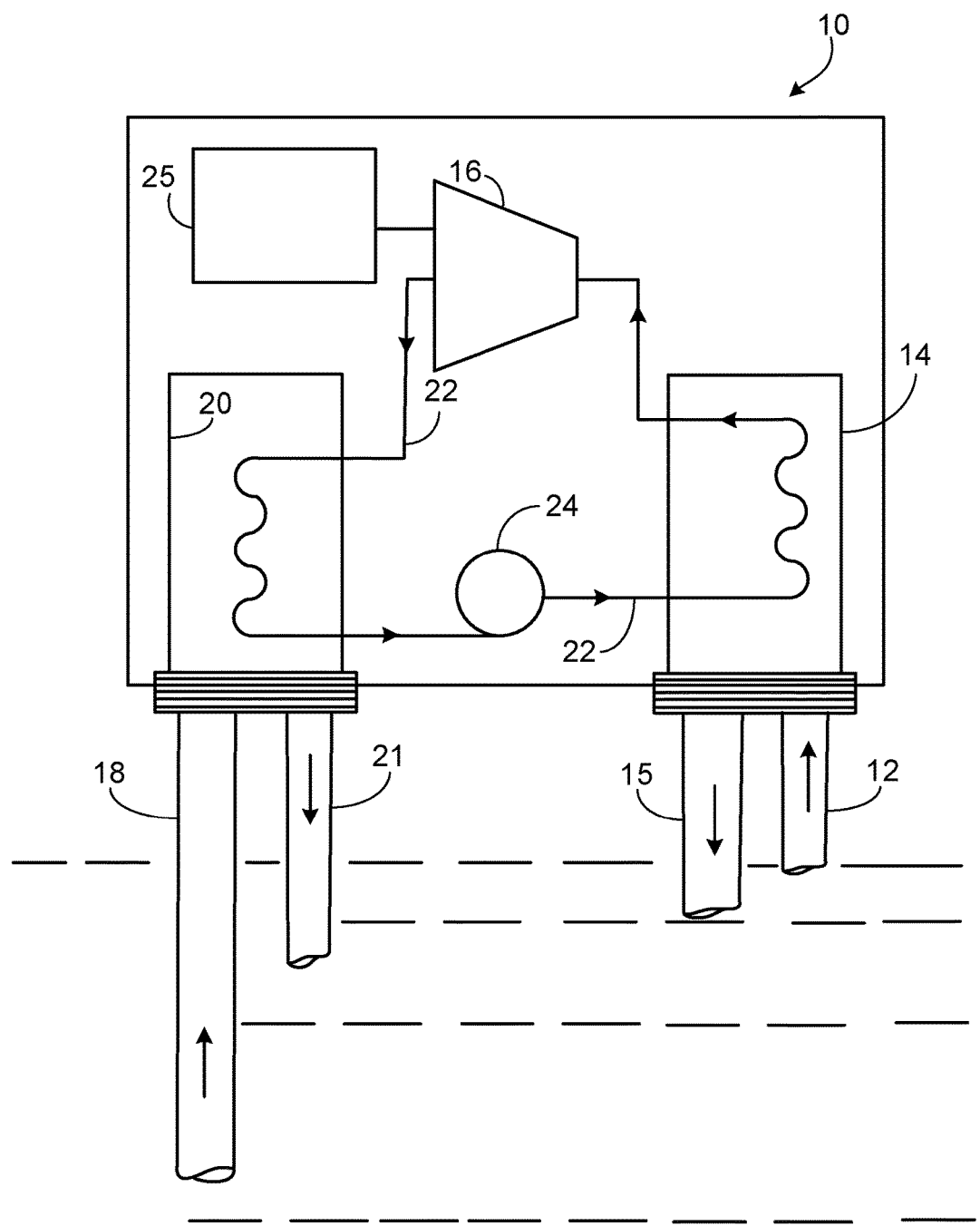
FIG. 1 illustrates an exemplary OTEC heat engine.

FIG. 1 illustrates a typical OTEC Rankine cycle heat engine 10 which includes warm sea water inlet 12, evaporator 14, warm sea water outlet 15, turbine 16, cold sea water inlet 18, condenser 20, cold sea water outlet 21, working fluid conduit 22 and working fluid pump 24.

In operation, heat engine 10 can use any one of a number of working fluids, for example commercial refrigerants such as ammonia. Other working fluids can include propylene, butane, R-22 and R-134a. Other commercial refrigerants can be used. Warm sea water between approximately 75° and 85° F., or more, is drawn from the ocean surface or just below the ocean surface through warm sea water inlet 12 and in turn warms the ammonia working fluid passing through evaporator 14. The ammonia boils to a vapor pressure of approximately 9.3 atm. The vapor is carried along working fluid conduit 22 to turbine 16. The ammonia vapor expands as it passes through the turbine 16, producing power to drive an electric generator 25. The ammonia vapor then enters condenser 20 where it is cooled to a liquid by cold sea water drawn from a deep ocean depth of approximately 3000 ft. The cold sea water enters the condenser at a temperature of approximately 40° F. The vapor pressure of the ammonia working fluid at the temperature in the condenser 20, approximately 51° F., is 6.1 atm. Thus, a significant pressure difference is available to drive the turbine 16 and generate electric power. As the ammonia working fluid condenses, the liquid working fluid is pumped back into the evaporator 14 by working fluid pump 24 via working fluid conduit 22.

The heat engine 10 of FIG. 1 is essentially the same as the Rankine cycle of most steam turbines, except that OTEC differs by using different working fluids and lower temperatures and pressures. The heat engine 10 of the FIG. 1 is also similar to commercial refrigeration plants, except that the OTEC cycle is run in the opposite direction so that a heat source (e.g., warm ocean water) and a cold heat sink (e.g., deep ocean water) are used to produce electric power.

Figure 2:
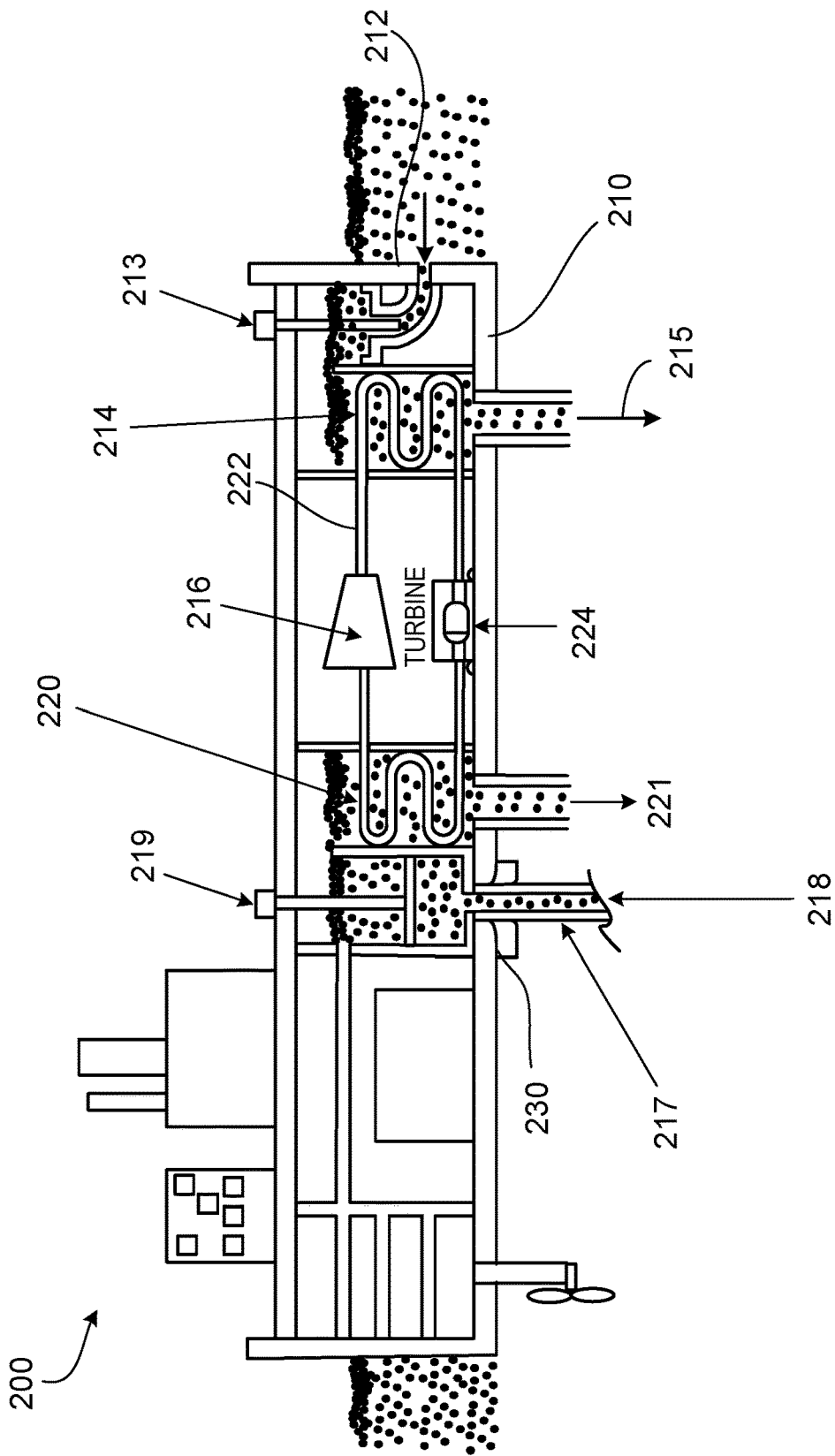
FIG. 2 illustrates an exemplary OTEC power plant.

FIG. 2 illustrates the typical components of a floating OTEC facility 200, which include: the vessel or platform 210, warm sea water inlet 212, warm water pump 213, evaporator 214, warm sea water outlet 215, turbo-generator 216, cold water pipe 217, cold sea water inlet 218, cold water pump 219, condenser 220, cold sea water outlet 221, working fluid conduit 222, working fluid pump 224, and pipe connections 230. OTEC facility 200 can also include electrical generation, transformation and transmission systems, position control systems such as propulsion, thrusters, or mooring systems, as well as various auxiliary and support systems (for example, personnel accommodations, emergency power, potable water, black and grey water, fire fighting, damage control, reserve buoyancy, and other common shipboard or marine systems.).

Implementations of OTEC power plants utilizing the basic heat engine and system of FIGS. 1 and 2 have a relatively low overall efficiency of 3% or below. Because of this low thermal efficiency, OTEC operations require the flow of large amounts of water through the power system per kilowatt of power generated. This in turn requires large heat exchangers having large heat exchange surface areas in the evaporator and condensers.

Such large volumes of water and large surface areas require considerable pumping capacity in the warm water pump 213 and cold water pump 219, reducing the net electrical power available for distribution to a shore-based facility or on board industrial purposes. Moreover, the limited space of most surface vessels does not easily facilitate large volumes of water directed to and flowing through the evaporator or condenser. Indeed, large volumes of water require large diameter pipes and conduits. Putting such structures in limited space requires multiple bends to accommodate other machinery. And the limited space of typical surface vessels or structures does not easily facilitate the large heat exchange surface area required for maximum efficiency in an OTEC plant. Thus the OTEC systems and vessel or platform have traditionally been large and costly. This has led to an industry conclusion that OTEC operations are a high cost, low yield energy production option when compared to other energy production options using higher temperatures and pressures.

Aspects of the systems and methods described address technical challenges in order to improve the efficiency of OTEC operations and reduce the cost of construction and operation.

The vessel or platform 210 requires low motions to minimize dynamic forces between the cold water pipe 217 and the vessel or platform 210 and to provide a benign operating environment for the OTEC equipment in the platform or vessel. The vessel or platform 210 should also support cold sea water inlet 218 and warm sea water inlet 212 volume flows, bringing in sufficient cold and warm water at appropriate levels to provide OTEC process efficiency. The vessel or platform 210 should also enable cold and warm water discharge via cold water outlets 221 and warm water outlets 215 well below the waterline of vessel or platform 210 to avoid thermal recirculation into the ocean surface layer. Additionally, the vessel or platform 210 should survive heavy weather without disrupting power generating operations.

The OTEC heat engine 10 should utilize a highly efficient thermal cycle for maximum efficiency and power production. Heat transfer in boiling and condensing processes, as well as the heat exchanger materials and design, limit the amount of energy that can be extracted from each pound of warm seawater. The heat exchangers used in the evaporator 214 and the condenser 220 require high volumes of warm and cold water flow with low head loss to minimize parasitic loads. The heat exchangers also require high coefficients of heat transfer to enhance efficiency. The heat exchangers can incorporate material and design that may be tailored to the warm and cold water inlet temperatures to enhance efficiency. The heat exchanger design should use a simple construction method with minimal amounts of material to reduce cost and volume.

Figure 3:
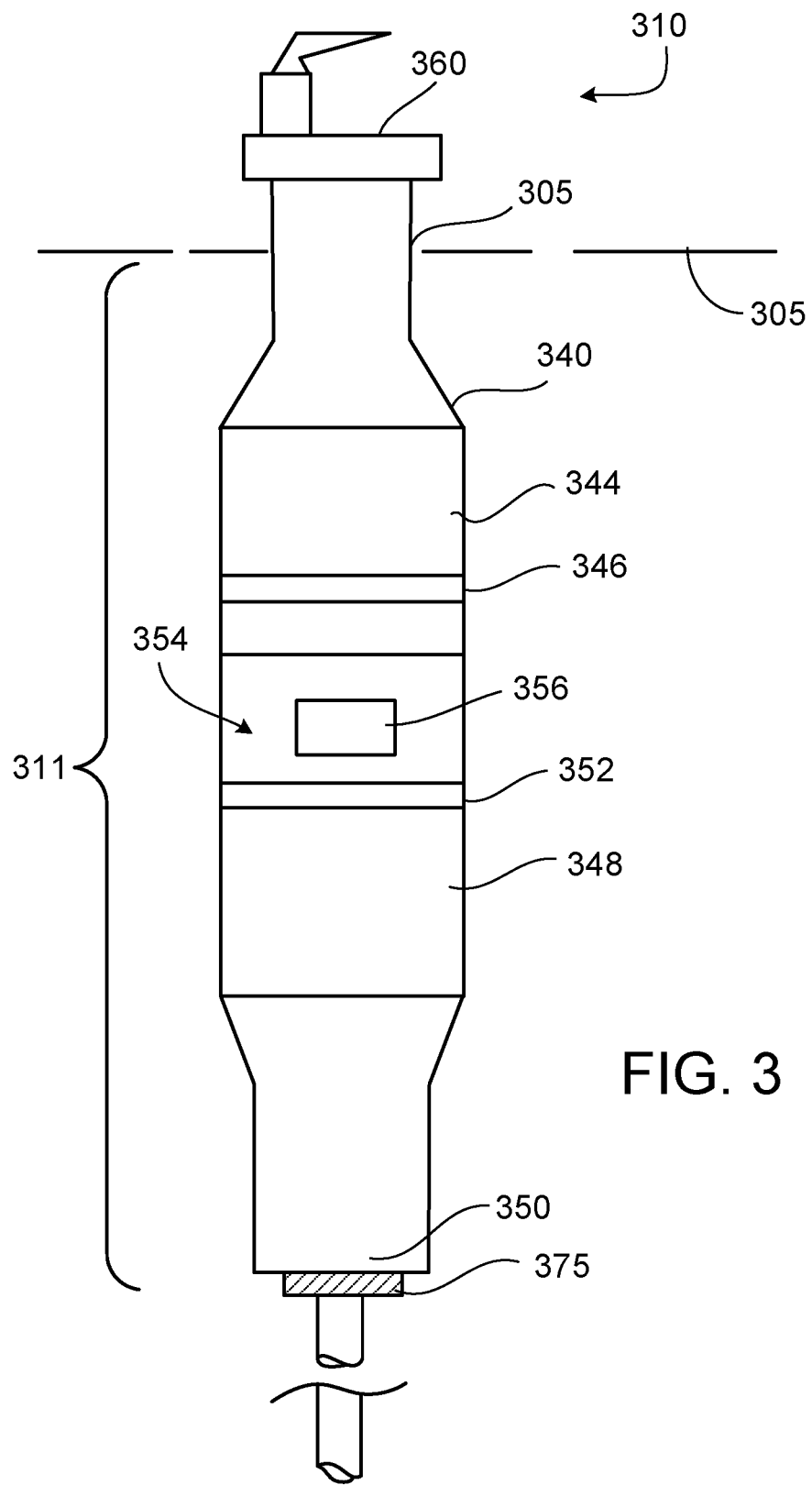
FIG. 3 illustrates an OTEC structure.

Turbo generators 216 should be highly efficient with minimal internal losses and may also be tailored to the working fluid to enhance efficiency FIG. 3 illustrates an implementation that enhances the efficiency of previous OTEC power plants and overcomes many of the technical challenges associated therewith. This implementation comprises a spar for the vessel or platform, with heat exchangers and associated warm and cold water piping integral to the spar.

OTEC spar 310 houses an integral multi-stage heat exchange system for use with an OTEC power generation plant. Spar 310 includes a submerged portion 311 below waterline 305. Submerged portion 311 comprises warm water intake portion 340, evaporator portion 344, warm water discharge portion 346, condenser portion 348, cold water intake portion 350, cold water pipe 217, cold water discharge portion 352, machinery deck portion 354. The spar 310 also includes a deck house 360 that overlies the submerged portion.

In operation, warm sea water of between 75° F. and 85° F. is drawn through warm water intake portion 340 and flows down the spar though structurally integral warm water conduits not shown. Due to the high volume water flow requirements of OTEC heat engines, the warm water conduits direct flow to the evaporator portion 344 of between 500,000 gpm and 6,000,000 gpm. Such warm water conduits have a diameter of between 6 ft and 35 ft, or more. Due to this size, the warm water conduits are vertical structural members of spar 310. Warm water conduits can be large diameter pipes of sufficient strength to vertically support spar 310. Alternatively, the warm water conduits can be passages integral to the construction of the spar 310.

Warm water then flows through the evaporator portion 344 which houses one or more stacked, multi-stage heat exchangers for warming a working fluid to a vapor. The warm sea water is then discharged from spar 310 via warm water discharge 346. Warm water discharge can be located or directed via a warm water discharge pipe to a depth at or close to an ocean thermal layer that is approximately the same temperature as the warm water discharge temperature to minimize environmental impacts. The warm water discharge can be directed to a sufficient depth to reduce the likelihood of thermal recirculation with either the warm water intake or cold water intake.

Cold sea water is drawn from a depth of between 2500 and 4200 ft, or more, at a temperature of approximately 40° F., via cold water pipe 217. The cold sea water enters spar 310 via cold water intake portion 350. Due to the high volume water flow requirements of OTEC heat engines, the cold sea water conduits direct flow to the condenser portion 348 of between 500,000 gpm and 6,000,000 gpm. Such cold sea water conduits have a diameter of between 6 ft and 35 ft, or more. Due to this size, the cold sea water conduits are vertical structural members of spar 310. Cold water conduits can be large diameter pipes of sufficient strength to vertically support spar 310. Alternatively, the cold water conduits can be passages integral to the construction of the spar 310. Cold sea water then flows upward to stacked multi-stage condenser portion 348, where the cold sea water cools a working fluid to a liquid. The cold sea water is then discharged from spar 310 via cold sea water discharge 352. Cold water discharge can be located or directed via a cold sea water discharge pipe to depth at or close to an ocean thermal layer that is approximately the same temperature as the cold sea water discharge temperature. The cold water discharge can be directed to a sufficient depth to reduce the likelihood of thermal recirculation with either the warm water intake or cold water intake.

Machinery deck portion 354 can be positioned vertically between the evaporator portion 344 and the condenser portion 348. Positioning machinery deck portion 354 beneath evaporator portion 344 allows nearly straight line warm water flow from intake, through the multi-stage evaporators, and to discharge. Positioning machinery deck portion 354 above condenser portion 348 allows nearly straight line cold water flow from intake, through the multi-stage condensers, and to discharge. Machinery deck portion 354 includes turbo-generators 356. In operation, warm working fluid heated to a vapor from evaporator portion 344 flows to one or more turbo-generators 356. The working fluid expands in turbo-generator 356 thereby driving a turbine for the production of electrical power. The working fluid then flows to condenser portion 348 where it is cooled to a liquid and pumped to evaporator portion 344.

The performance of heat exchangers is affected by the available temperature difference between the fluids as well as the heat transfer coefficient at the surfaces of the heat exchanger. The heat transfer coefficient generally varies with the velocity of the fluid across the heat transfer surfaces. Higher fluid velocities require higher pumping power, thereby reducing the net efficiency of the plant. A hybrid cascading multi-stage heat exchange system facilitates lower fluid velocities and greater plant efficiencies. The stacked hybrid cascade heat exchange design also facilitates lower pressure drops through the heat exchanger. The vertical plant design facilitates lower pressure drop across the whole system. A hybrid cascading multi-stage heat exchange system is described in U.S. Patent Publication No. US 2011/0173979 A1, entitled "Ocean Thermal Energy Conversion Plant," filed on Jan. 21, 2010 and concurrently with the present application, the entire contents of which are incorporated herein by reference and attached hereto as Appendix A.

As described above, OTEC operations require a source of cold water at a constant temperature. Variations in the cooling water can greatly influence the overall efficiency of the OTEC power plant. As such, water at approximately 40° F. is drawn from depths of between 2700 ft and 4200 ft or more. A long intake pipe is needed to draw this cold water to the surface for use by the OTEC power plant. Such cold water pipes have been an obstacle to commercially viable OTEC operations because of the cost in constructing a pipe of suitable performance and durability.

The cold water pipe ("CWP") is used to draw water from the cold water reservoir at an ocean depth of between 2700 ft and 4200 ft or more. The cold water is used to cool and condense to a liquid the vaporous working fluid emerging from the power plant turbine. The cold water pipe and its connection to the vessel or platform are configured to withstand the static and dynamic loads imposed by the pipe weight, the relative motions of the pipe and platform when subjected to wave and current loads of up to 100-year-storm severity, and the collapsing load induced by the water pump suction. The cold water pipe is sized to handle the required water flow with low drag loss, and is made of a material that is durable and corrosion resistant in sea water.

The cold water pipe length is defined by the need to draw water from a depth where the temperature is approximately 40° F. The cold water pipe length can be between 2000 feet and 4000 ft or more. In aspects of the present systems and methods described, the cold water pipe can be approximately 3000 feet in length.

The cold water pipe diameter is determined by the power plant size and water flow requirements. The water flow rate through the pipe is determined by the desired power output and OTEC power plant efficiency. The cold water pipe can carry cold water to the cold water conduit of the vessel or platform at a rate of between 500,000 gpm and 3,500,000 gpm, or more. Cold water pipe diameters can be between 6 feet and 35 feet or more. In aspects of the present disclosure, the cold water pipe diameter is approximately 31 feet in diameter.

Previous cold water pipe designs specific to OTEC operations have included a sectional construction. Cylindrical pipe sections of between 10 and 80 feet in length were bolted or joined together in series until a sufficient length was achieved. Using multiple cylindrical pipe sections, the cold water pipe could be assembled near the plant facility and the fully constructed pipe could be upended and installed. This approach had significant drawbacks including stress and fatigue at the connection points between pipe sections. Moreover, the connection hardware added to the overall pipe weight, further complicating the stress and fatigue considerations at the pipe section connections and the connection between the fully assembled cold water pipe and the OTEC platform or vessel.

Referring to FIG. 4, a continuous offset staved cold water pipe is shown. The cold water pipe 217 is free of the sectional joints present in previous cold water pipe designs, instead utilizing an offset stave construction. The cold water pipe 217 includes a top end portion 452 for connection to the submerged portion of the floating OTEC platform 411. Opposite top end portion 452 is bottom portion 454, which can include a ballast system, an anchoring system, and/or an intake screen.

Cold water pipe 217 comprises a plurality of offset staves assembled to form a cylinder. In some embodiments, the plurality of offset staves includes alternating multiple first staves 465 and multiple second staves 467. Each first stave includes a top edge 471 and a bottom edge 472. Each second stave includes a top edge 473 and a bottom edge 474. In a some embodiments, second stave 467 is vertically offset from an adjacent first stave portion 465 such that top edge 473 (of second stave portion 467) is between 3% and 97% vertically displaced from the top edge 471 (of first stave portion 465). The offset between adjacent staves can be approximately, 5%, 10%, 15%, 20%, 25%, 30%, 35%, 40%, 45%, 50% or more.

Individual staves of cold water pipe 217 can be made from polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyurethane, polyester, fiber reinforced polyester, vinyl ester, reinforced vinyl ester, concrete, ceramic, or a composite of one or more thereof. Individual staves can be molded, extruded, or pulltruded using standard manufacturing techniques. In some embodiments, individual staves are pulltruded to the desired shape and form and comprise a fiber or nylon reinforced vinyl ester. Vinyl esters are available from Ashland Chemical of Covington, Ky.

In some embodiments, staves are bonded to adjacent staves using a suitable adhesive. For example, staves comprising a reinforced vinyl ester are bonded to adjacent staves using a vinyl ester resin.

The staved design accounts for adverse shipping and handling loads traditionally experienced by segmented pipe construction. For example, towing and upending of traditionally constructed segmented cold water pipes imposes hazardous loads on the pipe.

Staved construction allows offsite manufacturing of multiple staves of 40 to 50 ft lengths. Each stave is approximately 52 inches wide and 1 to 6 inches thick. The staves can be shipped in stacks or containers to the offshore platform and the cold water pipe can then be constructed on the platform from the multiple staves. This eliminates the need for a separate facility to assemble pipe sections.

Further details of cold water pipe construction and performance are described in U.S. Patent Publication No. US 2011/0173978 A1, entitled "Ocean Thermal Energy Conversion Power Plant Cold Water Pipe," filed on Jan. 21, 2010, the entire contents of which are incorporated herein by reference and attached hereto as Appendix B.

The connection between the cold water pipe 217 and the spar submerged portion 311 presents construction, maintenance and operational challenges. For example, the cold water pipe is a 2000 ft to 4000 ft vertical column suspended in the dynamic ocean environment. The platform or vessel to which the cold water pipe connects is also floating in the dynamic ocean environment. Moreover, the pipe is ideally connected below the waterline, and, in some embodiments, well below the waterline and close to the bottom of the vessel. Maneuvering the fully assembled pipe into the proper position and securing the pipe to the vessel or platform is a difficult task.

The cold water pipe connection supports the static weight of the pipe suspended from the platform and accounts for the dynamic forces between the platform and the suspended pipe due to wave action, pipe vibration, and pipe movement.

Figure 5:
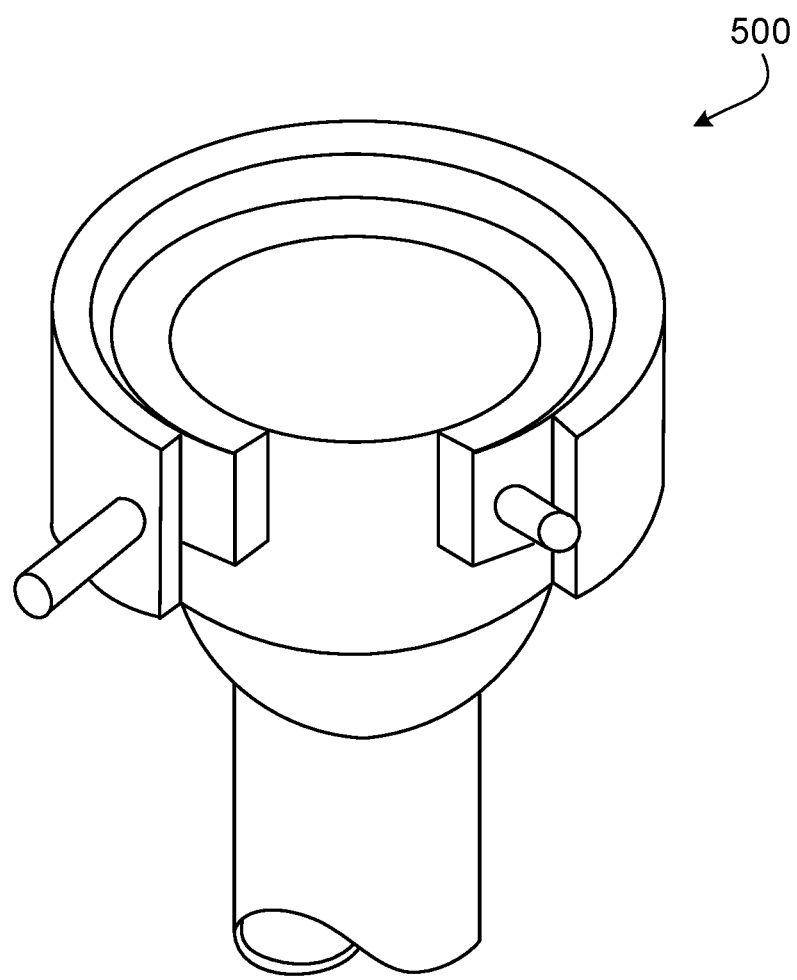
FIG. 5 illustrates an example of a gimbaled pipe connection.

Various OTEC cold water pipe connections, including gimbal, ball and socket, and universal connections, are disclosed in Section 4.5 of "Renewable Energy from the Ocean, a Guide to OTEC" William Avery and Chih Wu, Oxford University Press, 1994, incorporated herein by reference. Only the gimbal connection was operationally tested and included a two-axis gimbal allowing for 30° of rotation. As described in Avery and Wu, in the plane of the gimbal, a spherical shell formed the top of the pipe. A cylindrical cap with a flat ring of nylon and Teflon provided a sliding seal between the cold water in the pipe and the surrounding platform structure. The gimbaled pipe connection 500 is illustrated in FIG. 5.

Previous cold water pipe connections were designed for traditional hull forms and platforms that exhibit greater vertical displacement due to heave and wave action than spar platforms. One of the significant advantages of using the spar buoy as the platform is that doing so results in relatively small rotations between the spar itself and the cold water pipe even in the most severe 100-year storm conditions. In addition, the vertical and lateral forces between the spar and the cold water pipe are such that the downward force between the spherical ball and its seat keeps the bearing surfaces in contact at all times. In some embodiments, the downward force between the cold water pipe and the connection bearing surface is between 0.4 g and 1.0 g. Because this bearing, which also acts as the water seal, does not come out of contact with its mating spherical seat there is reduced or no need to install a mechanism to hold the cold water pipe in place vertically. This helps to simplify the spherical bearing design and also minimizes the pressure losses that would otherwise be caused by any additional cold water pipe restraining structures or hardware. The lateral forces transferred through the spherical bearing are also low enough that they can be adequately accommodated without the need for vertical restraint of the cold water pipe.

Aspects of the present systems and methods described allow for vertical insertion of the cold water pipe upwardly through the bottom of the platform. This is accomplished by lifting the fully assembled cold water pipe into position from below the platform. This facilitates simultaneous construction of the platform and pipe as well as providing for easy installation and removal of the cold water pipe for maintenance. Referring to FIG. 3, cold water pipe 217 connects to the submerged portion 311 of spar platform 310 at cold water pipe connection 375. The cold water pipe connects using a dynamic bearing with the bottom portion of the OTEC spar of FIG. 3.

In some embodiments, a cold water pipe connection is provided comprising a pipe collar seated via a spherical surface to a movable detent. The movable detent is coupled to the base of the spar platform. Incorporating the movable detent allows for vertical insertion and removal of the cold water pipe into and from the cold water pipe receiving bay.

FIG. 6 illustrates an exemplary system wherein cold water pipe connection 375 includes pipe receiving bay 776 comprising bay walls 777 and detent housings 778. Receiving bay 776 further comprises receiving diameter 780, which is defined by the length of the diameter between bay walls 777. In some embodiments, the receiving diameter is larger than the outer collar diameter 781 of cold water pipe 217.

Cold water pipe connection 375 and the lower portion of spar 311 can include structural reinforcement and supports to bear the weight and dynamic forces imposed on and transferred to spar 311 by cold water pipe 217 once suspended.

Referring to FIG. 7, cold water pipe connection 375 includes detent housing 778 and movable detent 840, which is mechanically coupled to the detent housing 778 to allow for movement of detent 840 from a first position to a second position. In a first position, movable detent 840 is housed within detent housing 778 such that the detent 840 does not protrude inwardly toward the center of the receiving bay 776 and remains outside of receiving diameter 780. In the first position, the top end portion 385 of cold water pipe 217 can be inserted into the pipe receiving bay 776 without interference from the moveable detent 840. In some embodiments, movable detent 840 can be housed in a first position such that no aspect of the movable detent 840 protrudes inwardly toward the center of receiving bay 776 past the outer collar diameter 781. In some embodiments, movable detent 840 in a first position does not interfere with the vertical movement of cold water pipe 217 through receiving bay 776.

In a second position, movable detent 840 extends beyond detent housing 778 and protrudes inwardly toward the center of receiving bay 776. In the second position, movable detent 840 extends inwardly past the outer collar diameter 781. Movable detent 840 can be adjusted or moved from a first position to a second position using hydraulic actuators, pneumatic actuators, mechanical actuators, electrical actuators, electro-mechanical actuators, or a combination of the above.

Movable detent 840 includes a partial spherical or arcuate bearing surface 842. Arcuate bearing surface 842 is configured to provide a dynamic bearing to cold water pipe bearing collar 848 when movable detent 840 is in a second position.

Cold water pipe bearing collar 848 includes collar bearing surface 849. Arcuate bearing surface 842 and collar bearing surface 849 can be cooperatively seated to provide a dynamic bearing to support the suspended weight of cold water pipe 217. Additionally, arcuate bearing surface 842 and collar bearing surface 849 are cooperatively seated to account for relative motion between the cold water pipe 217 and the platform 310 without unseating the cold water pipe 217. Arcuate bearing surface 842 and collar bearing surface 849 are cooperatively seated to provide a dynamic seal so that relatively warm water cannot enter pipe receiving bay 776 and ultimately cold water intake 350 once the cold water pipe 217 is connected to the platform 310 via cold water pipe connection 375. Once cold water pipe 217 is suspended, cold water is drawn through the cold water pipe via one or more cold water pumps and flows via one or more cold water passages or conduits to the condenser portion of a multi-stage OTEC power plant.

Arcuate bearing surface 842 and collar bearing surface 849 can be treated with a coating such as a Teflon coating to prevent galvanic interaction between the two surfaces.

It will be appreciated that any combination of a dynamic bearing surface and a movable detent or pinion to connect the cold water pipe to the floating platform are contemplated in the claims and the disclosure herein. For example, the arcuate bearing surface can be positioned above the movable detent, the arcuate bearing surface can be positioned to the side of the movable detent, or even below the movable detent. The movable detent can be integral to the bottom portion of the floating platform as described above. The movable detent can be integral to the cold water pipe.

Figure 8:
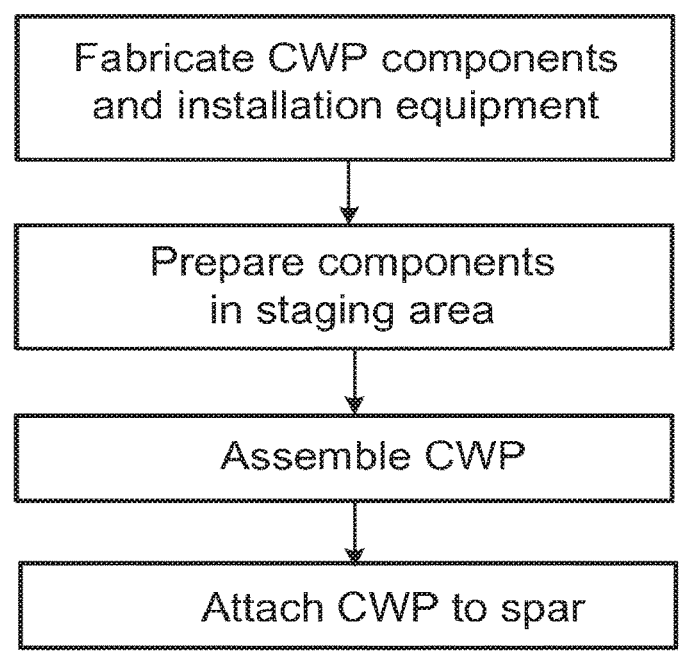
FIG. 8 illustrates a method of a cold water pipe connection.

FIG. 8 illustrates an exemplary method of fabricating and assembling a cold water pipe. The method includes fabricating the cold water pipe components and installation equipment and preparing the components for assembly in a staging area of an assembly site (e.g., on a floating barge). Once the cold water pipe components are properly staged on the floating barge, the cold water pipe can be assembled using equipment on the floating barge and/or the floating platform.

Example 1: Cold Water Pipe Assembly

Component and Assembly Equipment Fabrication

Prior to cold water pipe assembly and connection to the spar platform, various components are acquired and/or manufactured.

Figure 9:
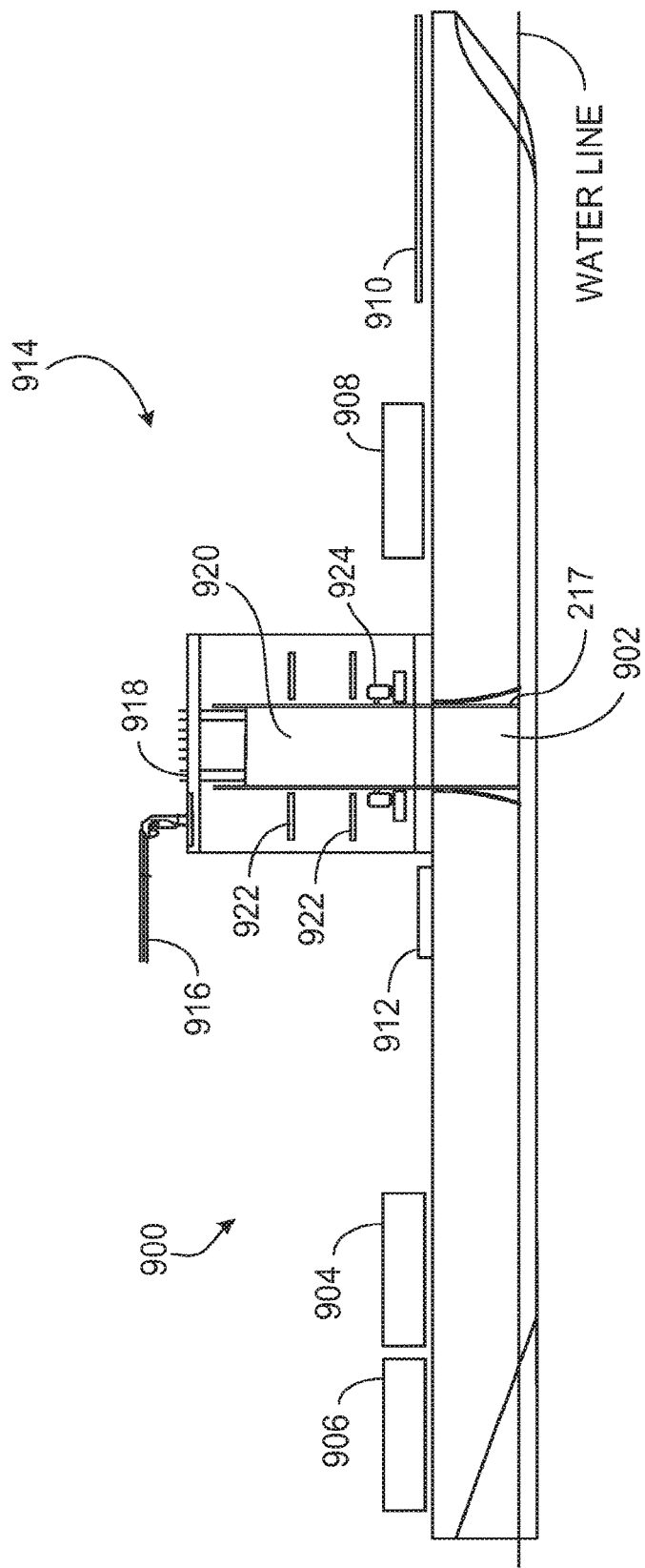
FIG. 9 illustrates a cold water pipe assembly platform.

A floating vessel, such as, for example, a barge (e.g., a tank barge) 900 is acquired to serve as an assembly platform for the cold water pipe 217. As shown in FIG. 9, a barge 900 including an open central bay (moon pool) 902 is typically used so that materials can be loaded into the water below the barge from a crane or lowering assembly centrally located in the barge, providing protection from the elements and minimizing relative motion between barge and the cold water pipe being lowered. In some cases, a tank barge is retrofitted to include a moon pool 902. By utilizing a moon pool 902, the barge 900 is better balanced during cold water pipe assembly than a barge that would load equipment into the water over the side of the barge. The barge 900 also supports other assembly equipment or facilities on its deck, such as, for example, storage areas 904, power generation stations 906, offices 908, a helo deck 910, and a stave laydown rack 912 to hold pipe staves prior to assembly. The barge 900 can be a single floating vessel with a moon pool 902, as shown, or two or more vessels structurally joined with a gap between them for lowering the cold water pipe 217. For example, the Crowley 455 Series barge has been used for design development and is about 400 ft long, about 105 ft wide, about 25 ft deep, has a lightship displacement of about 3,450 long tons, and about 100 long tons of additional displacement per inch of immersion.

The barge selected for the assembly process can be different in size, depending on availability, cost, expected environmental conditions, and maximum allowed motions during assembly. Depending on the type of barge used, longitudinal strength should be determined and ballasting may be required in order to remain within allowable longitudinal and transverse strength limits needed to support the assembly equipment.

The barge 900 includes a cold water pipe assembly gantry 914, as shown in FIGS. 9-11B, that is built on the deck of the barge 900 around the moon pool 902 to support various equipment used to assemble the cold water pipe 217. The exemplary assembly gantry 914 includes or supports a barge crane 916, stave alignment pins 918 along an upper surface of the assembly gantry 914, a stave assembly mandrel 920, two or more working decks 922, one or more cold water pipe reinforcement applicators 924, and lowering cables 926A and associate winches 926B, and a release cable 928A and associated winch 928B. To prevent the various cables from binding or getting tangled, the winches 926B, 928B are typically mounted on the barge deck and the cables 926A, 928A are arranged along the assembly gantry 914 using pulleys 930.

Further details of the assembly process are shown in FIGS. 12A-12D and 13. During the assembly process, the barge 900 serves as a staging area for the various components used to form the cold water pipe 217. As already discussed, cold water pipe components include, for example, strakes and strake fins, a bell mouth 932, a clump weight 934, and multiple pipe staves 936. The components are packaged (e.g., in crates or shipping containers) and shipped to a staging site (e.g., on the barge).

The pipe's staves 936 are typically 35 to 48 ft long so that they can fit within a standard International Standards Organization (ISO) 40-ft shipping container or a stretched ISO 54-ft container. Each stave 936 is constructed of a composite skin, such as, for example, a fiberglass reinforced polymer (FRP) and has a foam-filled interior. Staves 936 are designed to be joined along each of their longitudinal edges. The longitudinal edges have an interlocking interface, such as, for example, a tongue and groove-style joint connection so that they can be joined by sliding one stave longitudinally along an adjacent stave. The longitudinal edges of each stave 936 can include channels through which resin adhesive is applied (e.g., injected) to bind all adjacent edges in a permanent fashion. The end edges of each stave 936 are also designed to join one another. To join the ends of the staves, one end of each stave can have a tab feature and the other end can have a slot to receive the tab. In some embodiments, both ends include slots and inserts (e.g., joiners) are inserted into two adjacent slots, similar to a "biscuit-style joint." Strake fins are typically secured (e.g., adhered) to the outer surface of the staves 936 during stave manufacturing.

The prepared pipe staves 936 are packaged and organized in shipping containers in sequential order so that, during cold water pipe staging and assembly, they can be removed in the order that they are to be installed. The packaging order and thus the assembly order can be important, when staves 936 are intended to form a specific pattern (e.g., to form a spiral) around the cold water pipe 217 or alternatively when different length staves 936 are installed. From the shipping containers, the staves 936 are individually packaged into stave alignment jigs 948 and organized on the stave laydown rack 912. Each stave alignment jig 948 is typically a light-weight box into which a single stave 936, in some cases, with a strake attached, is packaged for transport from a shore site to the stave laydown rack 912 on the assembly site (e.g., the assembly barge 900) at sea. The top of each alignment jig 948 includes a lifting eye (offset to be above the center of gravity so that the jig is vertical when lifted by the crane) and the bottom of each jig 948 includes a flange that mates to protruding positioning and lock-down pins 918 positioned along the top of the assembly gantry 914. The assembly gantry 914 includes multiple sets of pins 918, the number of pins 918 corresponding to the number of pipe staves 936 positioned around the circumference of the cold water pipe 217. During installation, the pins 918 lock the base of each alignment jig 948 in place to provide proper positioning. While the pipe staves 936 typically remain in their alignment jigs until installation, other components (e.g., the clump weight 934 and the bell mouth 932) can be removed from their respective crates and laid out along a lay down area of the barge 900 to be prepared for assembly.

With the clump weight 934 and bell mouth 932 uncrated and positioned along a lay down area, they can be connected using multiple cables to form a bell mouth and clump weight assembly 938. The cables are sized so that the clump weight 934 and bell mouth 932 are about 12 to 36 feet apart from each other when suspended vertically. Attention and caution should be taken during assembly to increase the likelihood that cables are not crossed or tangled when being laid out and connected so that the clump weight 934 will hang properly from the bell mouth 932 when lifted.

Platform Staging

With the cold water pipe components on board the barge 900 and assembly equipment (e.g., portions of the assembly gantry 914) installed on the barge 900, the barge 900 can be towed to a platform 210 to begin assembly. Once in place near the platform 210, staging can begin, and various pieces of equipment are tested and/or prepared for assembly. For example, lowering cable winches 926B and a release cable winch 928B on the barge 900 undergo run out tests to check that the cables 926A, 928A have sufficient travel length to support the length of the cold water pipe 217 during assembly, are undamaged, and are in all respects suitable for a safe and secure installation. Run out tests are also conducted for one or more barge cranes 916. The run out tests confirm that the cranes 916 will perform suitably during subsequent processes.

Assembly begins once all testing is performed. First, a lifting and inflatable alignment truss assembly is inserted into the bell mouth 932 so the bell mouth and clump weight assembly 938 can be lifted. As shown in FIG. 12A, a hook of a barge crane 916 is lowered through the center of the inflatable alignment truss assembly and attached to the center of a lifting pad eye of bell mouth quick release connection devices (or "spreaders") 940. The spreader 940 spans outward and grips the inner wall of the pipe when the spider release cable 928A is in tension, Spider release cable is also attached at this time so that it goes down the center of the pipe. The spider release cable is the last cable from the barge to be disconnected. It is actually slackened only after the retraction cables from the spar are attached to the lifting lugs on the top of the CWP. The spider release cable 928A serves as a redundant attachment of the CWP to the barge to prevent loss of the CWP and also helps keep the CWP vertically oriented during assembly and lowering. Lowering cables 926A of the assembly gantry 914 are also lowered down through the moon pool 902 of the barge 900, pulled to the side of the barge 900, and lifted over the side of the barge 900. Once removed from the water, the lowering cables 926A are connected to the inflatable alignment truss assembly so that the bell mouth and clump weight assembly 938 can be supported by both the barge crane 916 and the lowering cables 926A. As shown in FIG. 12B, the bell mouth and clump weight assembly 938 is then carefully lifted by the barge crane 916 and slowly lowered into the water next to the barge 900. Once in the water, the barge crane 916 continues to slowly lower the bell mouth and clump weight assembly 938 until sufficiently deep so that tension can be assumed by drawing up the lowering cables 926A and the bell mouth and clump weight assembly 938 assumes a position below the assembly gantry 914 and the moon pool 902, as shown in FIG. 12C. After the bell mouth and clump weight assembly 938 is in position and supported by the lowering cables 926A, the cable attached to the barge crane 916 is released (e.g., using divers or a remotely operated release) from the bell mouth and clump weight assembly 938 and retracted back up over the side of the barge 900. As shown in FIG. 12D, with the bell mouth and clump weight assembly 938 supported by only the lowering cables 926A, the bell mouth and clump weight assembly 938 is lifted by the lowering cable winches 926B so that the top of the bell mouth 932 is about 24-48 inches above the deck of the barge 900 within the assembly gantry 914. The bell mouth 932 is inspected and cleaned in preparation for the next step in the assembly of the cold water pipe.

In some embodiments, a portion of the cold water pipe 217 is installed on the bell mouth 932 when the bell mouth 932 is on barge deck before being placed into the water. To install the portion of the cold water pipe 217, a series of pipe staves 936 are secured (e.g., using fasteners and adhesives) to the bell mouth 932.

Cold Water Pipe Assembly

Figure 10:
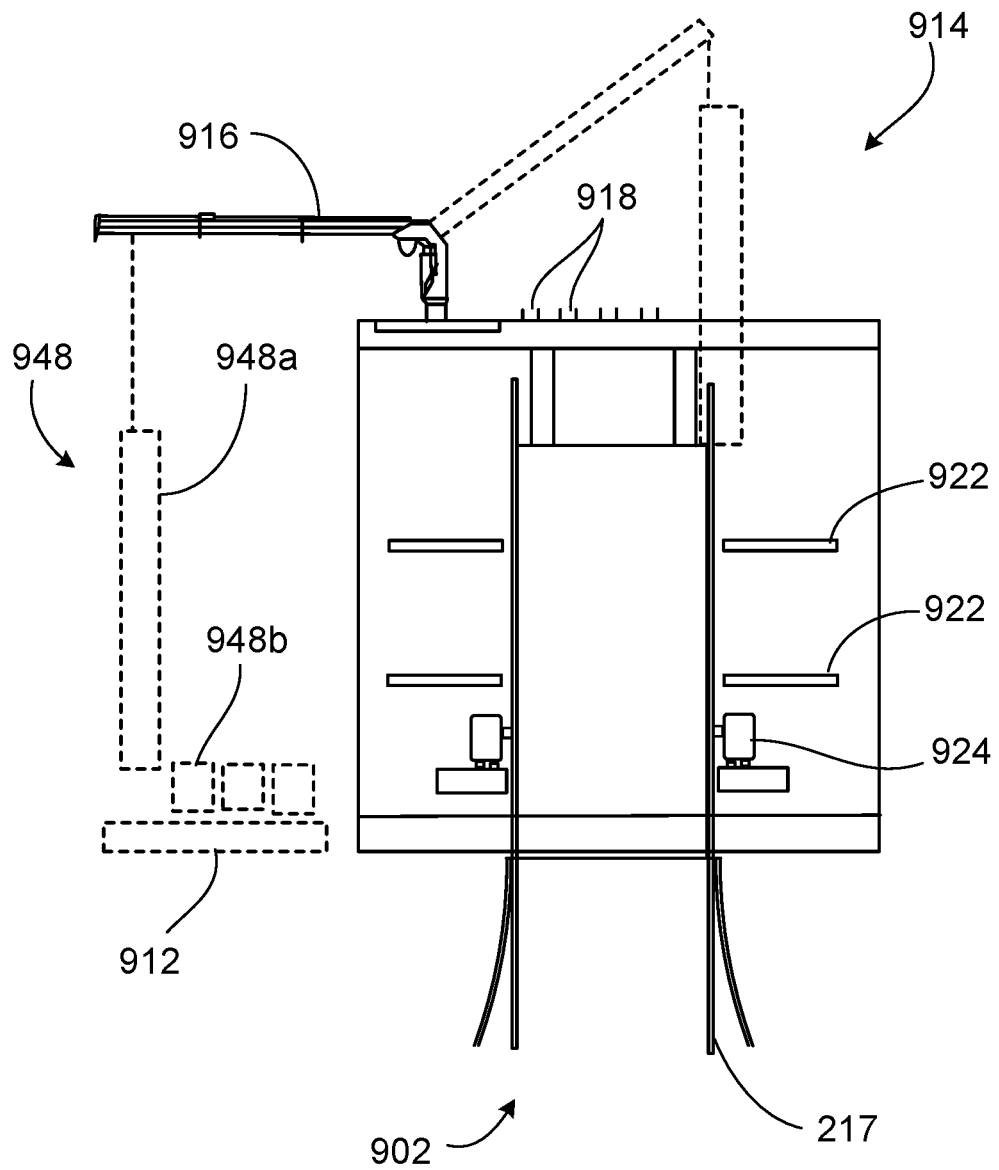
FIG. 10 illustrates an assembly gantry of the assembly site of FIG. 9.
Figure 11A:
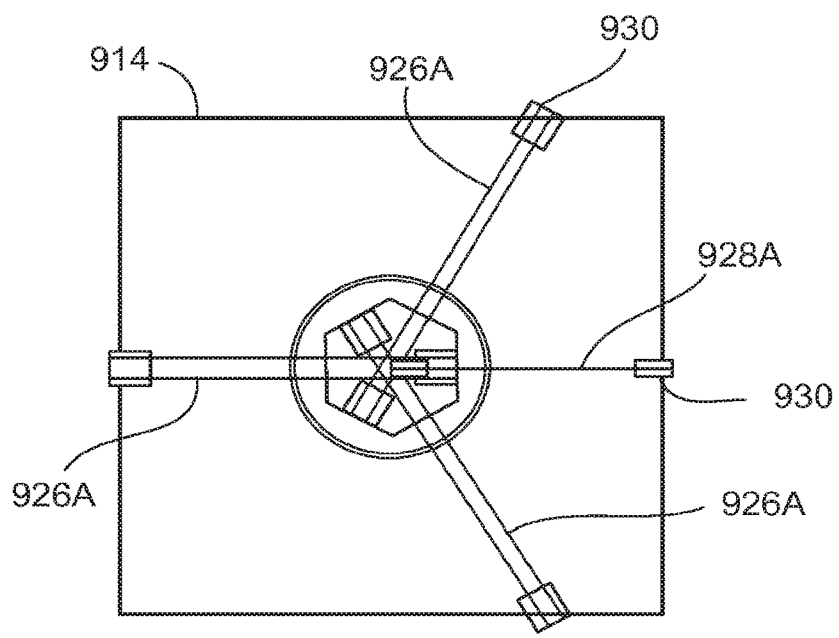
FIGS. 11A and 11B illustrate cable systems used to operate the assembly gantry of FIG. 10.
Figure 11B:
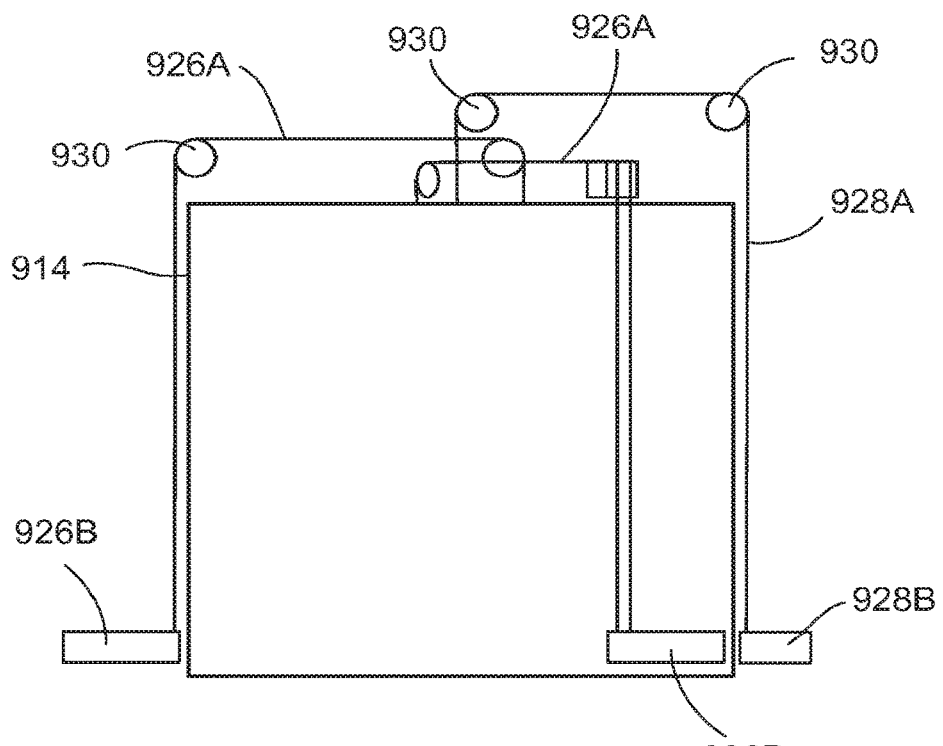
Figure 13:
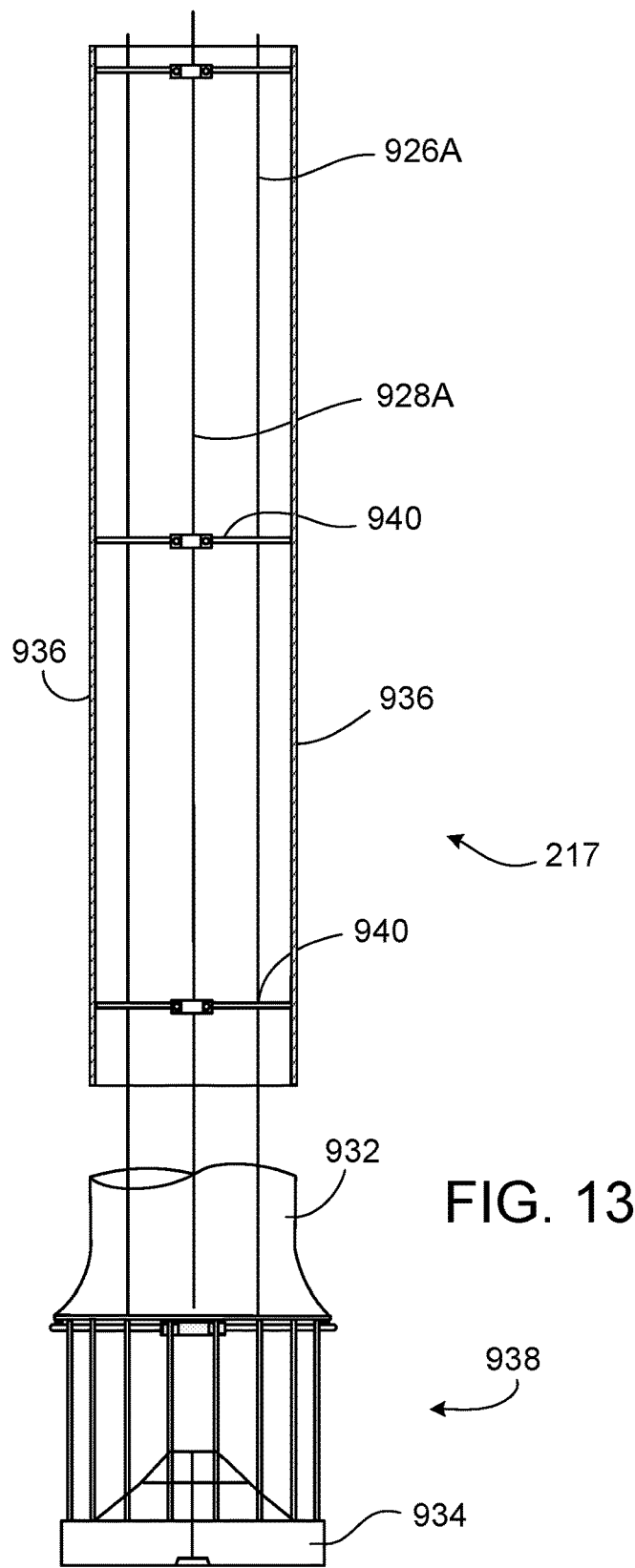
FIG. 13 a schematic view of cables used to suspend a cold water pipe during assembly.

Once the assembly gantry 914 is fully assembled and secured to the deck, the cold water pipe 217 can be assembled using the barge crane 916. Using the barge crane 916, as shown in FIG. 10, a first stave alignment jig 948a having a stave 936, as shown in FIG. 13, stowed within is lifted from the laydown rack 912. The crane positions the base of the alignment jig on one of the sets of pins 918 on the assembly gantry 914. Once in position, the pins 918 are locked and the first stave alignment jig 948a is secured to the assembly gantry 914. With the first stave alignment jig 948a secured to the assembly gantry 914, the barge crane 916 releases the first stave alignment jig 948a and is attached to the stave 936 therein. Once the stave 936 is attached to the barge crane 916, the first stave alignment jig 948a releases the stave 936 and the stave 936 is lowered using the barge crane 916 so that it moves along the slides of the first stave alignment jig 948a and down into the assembly gantry 914. As the stave 936 exits the first stave alignment jig 948a, personnel on the working decks 922 of the assembly gantry 914 position the stave 936 and the stave 936 is held in place against the mandrel 920 by upper and lower padded, dropdown, hinged snubber bars using the barge crane 916 or by other means such as local mechanisms at each snubber bar.

With the first stave 936 secured in place, the first stave alignment jig 948a is returned to the stave laydown rack 912 and a second stave alignment jig 948b is lifted and positioned on a second set of pins 918 adjacent to the set of pins on which the first stave alignment jig 948a was positioned. With the second stave alignment jig 948b in position on the pins 918, the second stave alignment jig 948b is secured to the assembly gantry 914. Once the second stave alignment jig 948b is secured to the assembly gantry 914, the second stave 936 is lowered into the assembly gantry 914. Personnel on the working decks 922 position the second stave 936 adjacent to the first stave and the second stave is held in place against the first stave and against the mandrel 920 by means of upper and lower padded, drop-down, hinged snubber bars using the barge crane 916.

Subsequent, additional stave alignment jigs 948 are lifted and secured to the assembly gantry 914 using pins 918 so that staves 936 can be installed in the same manner as the first and second staves. In each case, the stave alignment jig 948 that has been emptied of its stave is returned to the stave laydown rack 912. The staves 936 that form the first ring segment of the cold water pipe 217 are typically two different sizes (e.g., full length staves that are 35 to 40 feet long and shortened staves that are 20, 22, 24, 25, 26, 30 or 34 feet long). The different length staves 936 are assembled in an alternating sequence to create a staggered ring of staves 936. This results in the bottom ends of these staves forming flush against the top of the bell mouth 932, and the top ends to be staggered.

When all of the staves 936 required to complete a ring portion of the cold water pipe (e.g., 18 staves for a 22 foot diameter cold water pipe or 25 staves for a 31 foot diameter cold water pipe) are in place and form a first stave segment, circumferential tie wraps are fastened around the cold water pipe and lightly tensioned. To seal and bond the ends of staves 936 of the assembled stave segment, foam (e.g., syntactic foam) and resin are injected into inlets at the top of the staves 936 and flows down channels inside and along the longitudinal edges until excess resin flows from small-diameter drains at the base of the staves 936. Once resin begins to flow from the drains, injection is stopped and the stave drains are plugged. With resin injected, the tie wraps are tightened, excess resin can be removed, and the remaining resin is allowed to cure for a period of time, depending on the type of resin used. For example, resins can be used that are cured by application of UV and/or microwave rays. Such resins can typically be cured in about 90 to 210 seconds. In another embodiment, an adhesive bonding resin is applied in the fabrication process; one side bonded to the longitudinal edge of the stave and the edge yet to be fitted having a peel-away paper tape over it. Just prior to fitup of the snap together joint, the paper is peeled away and the adhesive resin is activated.

Once the resin is cured, the tie wraps are removed and the cold water pipe 217 is lowered so that the ends of the staves 936 (e.g., where the staves 936 meet the bell mouth 932) are in vertical alignment with the reinforcement applicators 924 at the lower portion of the assembly gantry 214. The reinforcement applicators 924 are configured to rotate around the cold water pipe 217 and wrap a bonding material, such as a composite fabric (e.g., resin infused nylon fabrics or pre-impregnated fabrics), around joints (e.g., the joint between the bell mouth and the first stave segment or alternatively joints between staves) to add additional support and strength and further seal the butt joints in the ends of the staves. The fabrics are wrapped around the first stave segment to overlap the bottom ends of the staves 936 by a distance that allows for suitable bonding and structural support. Typically, the material overlaps the bottom ends of the staves 936 by at least 6 inches up to about two feet.

The wrapped bonded joint between the bell mouth 932 and the first stave segment is allowed to cure in the air for a suitable amount of time (e.g., 1.5 to 8 minutes) to increase the likelihood of proper bonding before being lowered and submersed into the water. Typically, the bell mouth 932 and the first stave segment are pre-assembled as a subassembly that can be transported to the cold water pipe assembly site.

Once the bonded joint is sufficiently cured, the bell mouth and clump weight assembly 938 and bonded partial cold water pipe 217 assembly is lowered into the water until the nominal upper end of the cold water pipe 217 (e.g., the average height of the upper ends of the staves) is aligned with the working decks 922 of the assembly gantry 914 in a position to receive additional staves 936.

Additional staves 936 are assembled to form subsequent cold water pipe segments. The process of assembling additional stave segments on the current stave end segment is generally the same process discussed above with respect to assembling a stave segment onto the bell mouth. Because the top of the current stave segment is crenellated with alternating staves indented, the staves used can all be the same length in contrast to the assembly of the initial stave segment in which staves of different lengths are used to create the initial crenellation The staves 936 are continuously assembled onto cold water pipe 217 and the cold water pipe 217 is incrementally lowered and wrapped with bonding material around the ends of the staves 936 according to the process discussed above until the cold water pipe 217 is assembled to be a desired final length. When the final pipe length is reached, a top section (e.g., a prefabricated top section) is attached in a manner similar to the attachment of the bell mouth.

In the illustrated embodiment, the top section is a cold water pipe connection portion 942 that includes a circular metal cage encapsulated in the fiber and resin composite to form a tapered cylinder. The metal encapsulated within the fiber and resin composite pipe section serves as both backing structure for the pinions and as structural reinforcement for the cold water pipe retracted and captured in a recessed cavity in the bottom of the platform spar. The tapered upper section of the cold water pipe, known as the cold water pipe connection because it inserts a distance of about 4 to 12 feet into a tapered receptacle in the bottom of the platform spar, can be prefabricated as a single piece assembly then cut into two or three segments with each segment having one or more horizontal and vertical metal stiffeners encapsulated by resin and fiber. Typically, the assembly is prefabricated on shore as a finished subassembly so that it can be final machined to tightly fit in the steel recess of the female receptacle in the base of the platform spar. To reduce the likelihood of misalignment or an otherwise poor fit between the cold water pipe connection and the receptacle, final dimensions of the tapered receptacle are typically measured, recorded, and sent to the cold water pipe fabrication facility so that the composite cold water pipe connection can be made to match and fit snugly into the steel receptacle. The cold water pipe connection is segmented so that it can be installed around the lowering cables that extend down the center of the cold water pipe. The two joints (i.e., when the cold water pipe connection is divided into two segments) or three joints (i.e., when the cold water pipe is divided into three segments) typically have the cut edges built back up (e.g., by applying additional material) in the fabrication shop prior to shipping to restore the material removed during the cutting process. During this restoration, a joint (e.g., a lap joint similar to a tongue and groove joint) can be made for strength and sealing. Alternatively, biscuit slots can be formed along sides of the segments in which metal or composite biscuits can be inserted during final assembly.

To add tensile strength to the cold water pipe 217, the ends of the staves 936 can be fastened (e.g., bolted) together. For example, plates can be used to bolt one stave to another. In some embodiments, plates are used to sandwich an end joint adjoining two pipe staves 936 with a plate on the outer surface of the cold water pipe 217 bolted to a plate on the inner surface of the cold water pipe 217. In some embodiments the tabs used to connect staves (e.g., biscuits) are bolted to the adjoining stave instead of using additional plates. In some embodiments, the bolts are used instead of the exterior wrapping. In some embodiments, the bolts are used in combination with the exterior wrapping.

Since the cold water pipe 217 is supported from its lower end during assembly, a buckling or collapsing risk exists, especially as the cold water pipe 217 becomes very long. As shown in FIG. 13, spreaders 940 can be positioned along the inner wall of the cold water pipe 217 to prevent collapse of the cold water pipe 217. The spreaders 940 are attached to the release cable 928A (shown in FIGS. 11A and 13) and provide an outward force along the inner surface of the cold water pipe 217. As shown in FIG. 13, the spreaders 940 are spaced apart by a distance (e.g., 50 ft) along the cold water pipe 217 to fairlead the lowering cables 926A. These spreaders are not the same as the bell mouth and clump weight lifting and inflatable alignment truss assembly. However, both rely on release cable 928A. The spreaders 940 reduce the likelihood of the lowering cables 926A substantially moving horizontally and increase the likelihood that the force along the lowering cables 926A is maintained in a vertical direction to avoid long column buckling of the cold water pipe 217. The portions of the spreaders that contact the inner wall of the cold water pipe 217 are contoured to fit the inner wall and typically include pads of a material softer than the cold water pipe walls (e.g., natural rubber, neoprene or butyl rubber) to prevent abrasion or other damage to the cold water pipe 217.

Once the cold water pipe 217 reaches a desired length (e.g., 2650 feet or when the bell mouth is about 3000 feet below the ocean surface), a cold water pipe connection portion 942 can be installed on top of the cold water pipe 217 so that the cold water pipe 217 can subsequently be attached to the underside of an OTEC facility 200. The cold water pipe will typically be about 2650 feet long. Using a barge crane or cranes 916, the cold water pipe connection portion 942 is lifted using one or more pad eyes positioned on the top of the cold water pipe connection portion 942. Typically, there will be several winches or cranes mounted on the barge including at least two simple boom cranes for lifting and positioning staves 936 in the fixture, and at least one heavy lift boom crane for cable 928A.

Figure 14A:
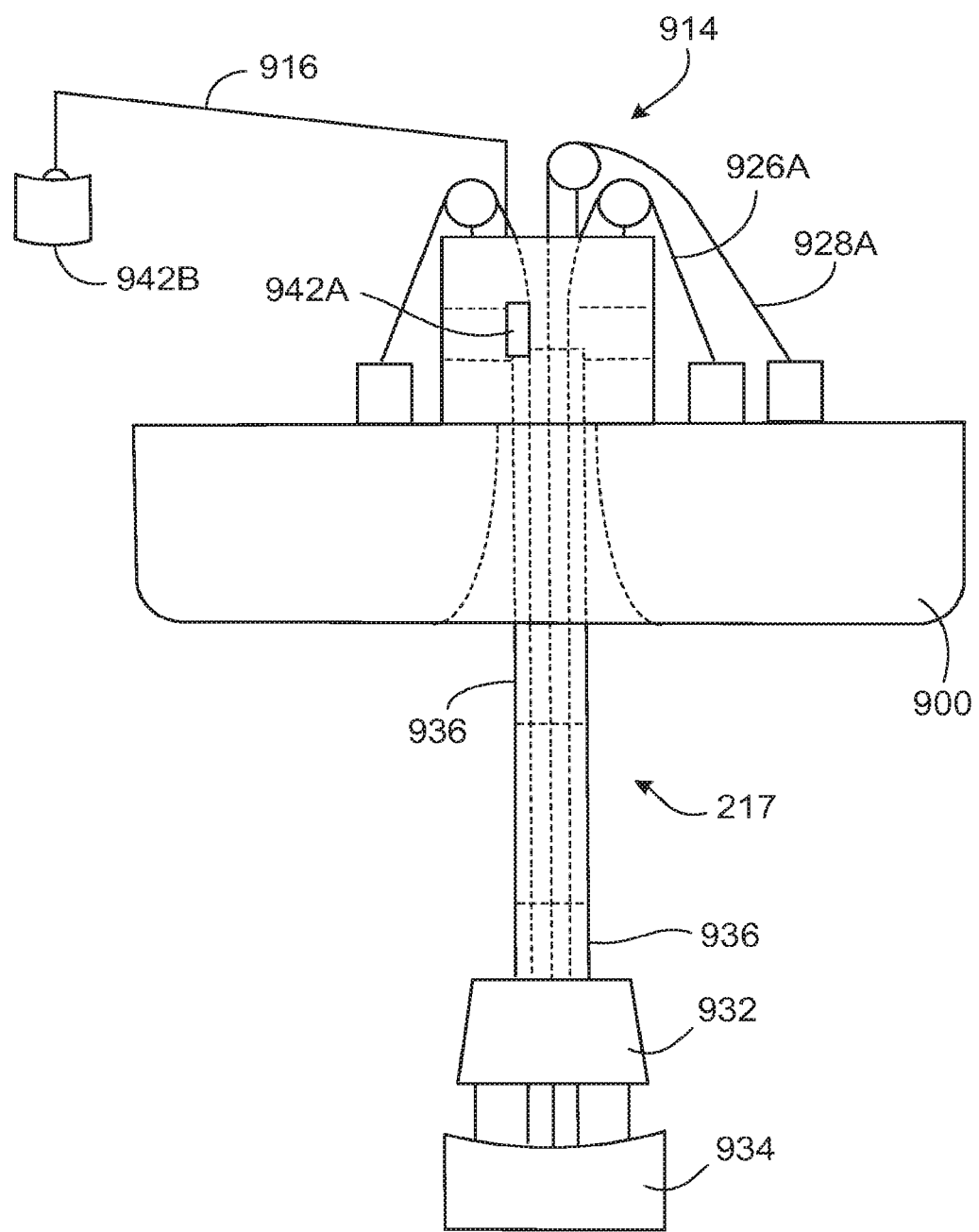

As shown in FIGS. 14A-C, in some embodiments, the cold water pipe connection portion 942 is in the form of multiple (e.g., two, three, four, five, or more) pieces 942a, 942b, 942c . . . so that the pieces can be assembled on top of the cold water pipe 217 while it is supported by the cables 926A, 928A running down the inside of the pipe 217. Implementing the cold water pipe connection portion 942 in multiple pieces enables installation of the pieces 942a, 942b, 942c . . . along the top edge of the cold water pipe 217 using the barge crane 916. The individual pieces 942a, 942b, 942c . . . of the cold water pipe connection portion 942 are lifted using the barge crane 916 and a resin bonding material (e.g., polyurethane, vinylester, polyester) is applied to the adjoining surfaces of the cold water pipe 217 and the connection portion 942 and then the connecting portion 942 is placed into position at the top of the cold water pipe 217. The remaining pieces of the cold water pipe connection portion 942 are lifted and installed in the same manner until the entire cold water pipe connection portion 942 is assembled atop the cold water pipe 217. The individual pieces 942a, 942b, 942c . . . of the cold water pipe connecting portion 942 can be fastened (e.g., bolted) together to provide additional strength. It is envisioned that a strong mechanically tight joint can be achieved by torquing the fasteners much like is seen in many brick and stone buildings from before the turn of the 20th century that have rods run fully through from outside wall to opposite outside wall.

In some embodiments, each piece 942a, 942b, 942c . . . of the connection portion 942 is secured to the cold water pipe 217 using adhesive before a next piece is put into place. As shown in FIG. 14B, in some embodiments, each of the pieces 942a, 942b, 942c . . . are temporarily secured (e.g., using fixturing) so that the entire cold water pipe connection portion 942 can be fully assembled (e.g., using fasteners) prior to being secured to the cold water pipe 217 using adhesive. It is envisioned that a strong mechanically tight joint can be achieved by torquing the fasteners much like is seen in many brick and stone buildings from before the turn of the 20th century that have rods run fully through from outside wall to opposite outside wall.

When the cold water pipe connection portion 942 is assembled prior to being secured to the cold water pipe 217, the top and outside surfaces of the cold water pipe 217 and the inside surface of the assembled cold water pipe connection portion 942 are coated with a resin bonding material (e.g., urethane, polyurethane, vinylester, polyester, epoxy) before lowering the cold water pipe connection portion 942 on top of the cold water pipe 217. As shown in FIGS. 14A and 14B, the cold water pipe connection portion 942 is lowered into place on top of the cold water pipe 217 and the top of the cold water pipe 217 is inserted into the bottom of the cold water pipe connection portion 942.

As shown in FIG. 14C, once the pieces of the cold water pipe connection portion 942 are assembled and bonded to the top of the cold water pipe 217, the joint is then wrapped with resin impregnated fiber fabric 944 in order to reinforce the joint. The fiber fabric 944 is applied to overlap the joint and taper the reinforcement to form a feathered edge on both the cold water pipe 217 and cold water pipe connection portion 942.

The bonded joint is allowed to cure for approximately 24 hours in air above the water. Once cured, the entire cold water pipe assembly 217 is submersed in the water below and lowered beneath the bottom of the barge 900 using the lowering cables 926A for subsequent attachment to a floating platform 210.

Example 2: Cold Water Pipe Assembly

Platform Staging

In some embodiments, equipment positioned along a floating platform 210 can be used to assemble the cold water pipe 217. In such embodiments, once the cold water pipe components (e.g., pipe staves 936, bell mouth 932, and clump weight 934) and assembly equipment (e.g., lowering winches 926B) are on board the barge 900 and ready for assembly, the barge 900 can be towed to a platform 210 for cold water pipe assembly. Once in place near the platform 210, staging can begin and various pieces of equipment are tested and/or prepared for assembly. For example, the lowering winches 926B on the barge 900 undergo a run out test to check that the lowering cables 926A have sufficient travel length to support the length of the cold water pipe 217 during assembly.

Run out tests are also conducted for a platform crane 946 positioned on the floating platform 210. The run out test confirms that the platform crane 946 will perform suitably during subsequent processes. Assembly begins once the testing is performed, and a lifting and inflatable alignment truss assembly is inserted into the bell mouth 932 so the bell mouth and clump weight assembly 938 can be lifted. A hook of the platform crane 946 is lowered through the center of the inflatable alignment truss assembly and attached to the center of a lifting pad eye of the bell mouth and clump weight assembly 938.

With the bell mouth and clump weight assembly 938 attached to the platform crane 946, the bell mouth and clump weight assembly 938 is carefully lifted to a height so that the bottom of the clump weight 934 clears the deck of the barge 900 by about 3 feet. As shown in FIG. 15A, once the bell mouth and clump weight assembly 938 is lifted from the deck, the barge 900 is moved so that the drop out center (e.g., moon pool 902) of the barge 900 is positioned under the suspended bell mouth and clump weight assembly 938. In some embodiments, the platform crane may be attached to the spar, in other embodiments the platform crane may be attached to the assembly barge. In the former the crane is numerically referred to as 946. In the latter the crane is numerically referred to as 916 (see above).

Once the barge 900 is properly positioned under the bell mouth and clump weight assembly 938, as shown in FIG. 15B, the platform crane 946 lowers the bell mouth and clump weight assembly 938 through the drop out center of laydown barge 900 until lifting pad eyes installed on a flange of bell mouth 932 are positioned at a height that is near the waist-height of worker on deck of barge (e.g., 24-36 inches from the deck). With the bell mouth 932 positioned at a suitable height, the ends of the lowering cables 926A are attached to the four lifting pad eyes of the bell mouth flange.

With the bell mouth 932 connected to the lowering cables 926A, the weight of the bell mouth and clump weight assembly 938 is transferred from the platform crane 946 to the lowering cables 926A so that cold water pipe 217 can be assembled. To transfer weight, as shown in FIG. 15C, the platform crane 946 slowly lowers the platform crane hook to increase tension in the lowering cables 926A until the weight of the bell mouth and clump weight assembly 938 is substantially completely supported by the lowering cables 926A attached to the lifting pad eyes.

Still referring to FIG. 15C, using the lowering cables 926A, the bell mouth and clump weight assembly 938 is lowered until the top of the clump weight 934 is about 20 feet beneath the bottom of the laydown barge 900. One or more deployed divers then detach the platform crane hook from the pad eye on the bell mouth 932 so that the platform crane hook can be raised above the bell mouth and clump weight assembly 938. With the bell mouth and clump weight assembly 938 now supported only by the lowering cables 926A, the bell mouth and clump weight assembly 938 is lowered so that the top of the bell mouth 932 is about 24-36 inches above the deck of the barge 900.

Cold Water Pipe Assembly & Installation

With the bell mouth 932 in proper position with respect to the barge deck and the platform crane 946 detached from the bell mouth 932, a cold water pipe assembly guide ring can be installed on the deck. Using the platform crane 946, a first segment of the cold water pipe assembly guide ring is lifted and placed on the barge deck at edge of drop out center and then fastened (e.g., bolted) to deck support structure.

Using the platform crane 946, a second segment of the cold water pipe assembly guide ring is lifted and positioned into place abutting the first segment of the cold water pipe assembly guide ring and the first and second segments are fastened (e.g., bolted) together and to deck support structure.

Remaining segments of the cold water pipe assembly guide ring are lifted and placed into position and then fastened (e.g., bolted) together and to deck support structure until entire ring is assembled and secured to the barge deck.

Once the cold water pipe assembly guide ring is fully assembled and secured to the deck, the platform crane hook is replaced with a stave lifting grip-clamp attachment so that staves 936 can be lifted and handled by the platform crane 946.

Using the platform crane 946, as shown in FIG. 16A, a first stave is lifted by its top end and moved into position in the cold water pipe assembly guide ring. To install the first stave 936, a bottom end of the first stave 936 is aligned with an alignment tab on top of the bell mouth and clump weight assembly 938 and the stave 936 is lowered so that the bottom end aligns with the alignment tab. Once lowered into position, the first stave is retained in place and clamped to the cold water pipe assembly guide ring.

Using the platform crane 946, a second stave is lifted by its top end and moved into place in the cold water pipe assembly guide ring. Before the first and second staves are attached to each other, bonding material, such as an adhesive (e.g., epoxy), is applied along the longitudinal edge of the second stave which is adjacent to first stave.

With adhesive applied to the second stave, the first and second staves are attached to each other using self-retaining mating features of each stave. The self-retaining features can include "snap-in" mechanisms that hold the staves together once they have been connected.

As shown in FIG. 16B, additional staves 936 are lifted by the platform crane 946 and lowered into position to receive adhesive along their longitudinal edges, and "snapped-in" to engage adjacent staves 936. The additional staves 936 are installed and assembled until a solid ring section of pipe (a first stave segment) is formed, as shown in FIG. 16C. As shown, the staves 936 are assembled in a staggered manner to allow for distributing tensile forces along the cold water pipe 217.

Once the first stave segment is formed, a bonding material 944, such as a composite fabric (e.g., resin infused nylon fabrics or pre-impregnated fabrics), is wrapped around the joint between the bell mouth 932 and the first stave segment to add additional support and strength. The composite fabrics 944 are wrapped around the first stave segment to overlap the bottom ends of the staves 936 by a distance that allows for suitable bonding and structural support. Typically, the material overlaps the bottom ends of the staves 936 by at least about two feet.

The wrapped bonded joint between the bell mouth 932 and the first stave segment is allowed to cure in the air for a suitable amount of time (e.g., 4 to 40 minutes) to increase the likelihood of proper bonding before being lowered by the lowering cables 926A and submersed into the water.

Once the bonded joint is sufficiently cured, the bell mouth and clump weight assembly 938 and partial cold water pipe assembly 217 is lowered into the water until the nominal upper end of the pipe (e.g., the average height of the upper end of the staves) is about waist high from the barge deck (e.g., 24-36 inches).

With the first stave segment complete and lowered toward the water, staves 936 can be lifted to begin assembling the remaining length of the cold water pipe 217. To begin, the platform crane 946 lifts a stave 936 by its top end guides the stave 936 into position atop a stave 936 of the first stave segment that is at the lowest height of all staves of the first stave segment. Similar to the staves of the first segment, adhesive is applied to the longitudinal edges of the subsequent staves.

Additional staves 936 are sequentially lifted and placed atop the lower staves, and each stave 936 is placed adjacent to the previously installed stave 936. After multiple (e.g., three) staves 936 are placed adjacent to each other, a flexible composite rod is passed through lightening holes in the cross section of the staves 936 to secure them together circumferentially. The composite rod passes through a top portion of a lower stave (e.g., a stave of the first staved segment), through a bottom portion of a second stave (e.g., a stave positioned on top of a stave of the first staved segment), and extends into at least one other adjacent stave, thereby locking them together. Securing adjacent staves 936 by attaching the bottom end of one stave to the top end of another stave helps to add tensile strength to the cold water pipe 217.

To seal and bond the ends of staves of the assembled portion of the cold water pipe 217, foam (e.g., syntactic foam) and resin are injected into a port in the end of lower positioned stave until it flows out of a port in the end of a higher positioned stave.

After the bonding material applied between staves and the foam and resin have been given time to cure appropriately, the cold water pipe 217 is lowered deeper into the water and the process of lifting and positioning staves 936 on top of one another in a circumferential sequence, applying adhesive along a longitudinal edge of each stave 936 as they are placed into position, snapping each stave to the adjacent stave, securing adjacent staves together using flexible composite rods, injecting foam into the staves, and then lowering the cold water pipe 217 is continued until the cold water pipe 217 reaches a desired length. As discussed above, the cold water pipe 217 is periodically wrapped with a bonding material, such as a composite fabric 944 (e.g., resin infused nylon fabrics or pre-impregnated fabrics), to provide additional support and radial strength. Each wrapped portion is allowed to cure before the cold water pipe 217 is lowered deeper into the water. The composite fabric 944 is applied typically every 3-7 ft. (e.g., every 5 ft) along the cold water pipe 217. When strakes and strake fins are used, in some embodiments, the strakes are applied to the outer surface of the cold water pipe 217 using adhesives that are allowed to cure before being submerged into the water. In some cases, the strakes are applied to the staves 936 before the staves 936 are assembled to form the cold water pipe 217.

Once the cold water pipe 217 reaches a desired length (e.g., 2650 feet long, or the bottom of the clump weight is 3000 feet beneath the ocean surface), a cold water pipe connection portion 942 can be installed on top of the cold water pipe 217. Using the platform crane 946, the cold water pipe connection portion 942 is lifted using a cable sling spread attached to lifting pad eyes positioned on the top of the cold water pipe connection portion 942.

The top and outside surfaces of the cold water pipe 217 and the inside surface of the cold water pipe connection portion 942 are coated with resin bonding material (e.g., urethane, polyurethane, vinylester, polyester, epoxy) before lowering the cold water pipe connection portion 942 on top of the cold water pipe 217. As shown in FIGS. 17A and 17B, the cold water pipe connection portion 942 is then lowered into place on top of the cold water pipe 217 so that the top of the cold water pipe 217 is inserted into the bottom of the cold water pipe connection portion 942.

As shown in FIG. 17C, once the cold water pipe 217 is inserted into the cold water pipe connection portion 942, the joint is then wrapped with resin impregnated fiber fabric 944 in order to reinforce the joint. The fiber fabric 944 is applied to overlap the joint and taper the reinforcement to form a feathered edge on both the cold water pipe 217 and cold water pipe connection portion 942.

The bonded joint is allowed to cure in air above the water for approximately 24 hours. Once cured, the entire cold water pipe 217 is submersed in the water and lowered using the lowering cables 926A for subsequent attachment to a floating platform 210.

Transfer of the Assembled Cold Water Pipe to the Floating Platform

Referring to FIGS. 18A-C, once under water and fully assembled, the cold water pipe 217 can be detached from the barge 900, transferred to the floating OTEC spar 310. Transfer and connection of the cold water pipe 217 from the barge 900 to the spar 310 will now be described with reference to the assembly platform discussed with respect to FIGS. 12A-12D. It is understood, however, that the transfer and connection process is not limited to being used with any specific assembly platform.

Initially, an underwater utility vehicle (ROV) is launched and checked for functionality, and then is retained underwater in the vicinity of the barge 900 but outside the work area.

While the assembled cold water pipe 217 is still attached to the barge 900, fixed keeper cables 950 are rigged from within the gantry 914 to the top of the cold water pipe connection portion 942 at the top of the cold water pipe 217 (FIG. 18A). The keeper cables 950 are sized to allow the top of the cold water pipe 217 to extend about 600 feet below the water line, which is several hundred feet below the bottom of the spar 310.

Winches 926B and 928B lower the cold water pipe 217 until the weight of the cold water pipe 217 is borne by the fixed keeper cables 950. The lowering cables 926A and the release cable 928A extending from the winches 926B and 928B are then slackened.

Once the cold water pipe 217 is supported by the fixed keeper cables 950, the ROV maneuvers to the top of the cold water pipe 217, and the lowering cables 926A are released from the top of the cold water pipe connection portion 942 (FIG. 18B).

With the cold water pipe 217 supported by the keeper cables 950, the assembly barge 900 is brought as close as practical and safe alongside the spar 310. The spreader support fixture and the spreaders 940 are retracted from the interior of the cold water pipe 217 by winching in the release cable 928A. During retraction, each of the arms of the spreaders 940 rotates downward and away from the inner wall of the cold water pipe 217. The detached spreaders 940 are then winched upward, then stowed as they reach the gantry 914.

When the spreader support fixture and spreaders 940 have been stowed, cold water pipe permanent support cables 952 are extended from inside the cold water pump room of the spar 310 so as to hang below the spar 310 (FIG. 18C). The ROV attaches the slack cold water pipe permanent support cables 952 to the top of the cold water pipe connection portion 942.

After the slack cold water pipe permanent support cables 952 are attached to the top of the cold water pipe connection portion 942, winches inside the spar cold water pump room draw in the cold water pipe permanent support cables 952 until theses cables 952 bear the entire load of the cold water pipe 217. At this point, the ROV detaches the keeper cables 950 from the top of the cold water pipe connection portion 942 and the keeper cables 950 are withdrawn into the assembly barge 900 (FIG. 18D).

Using the cold water pipe permanent support cables 952, the cold water pipe 217 is then raised into the submerged portion 311 of the spar and is seated in the cold water pipe connection 375 (FIG. 18E).

Movable detents 840 lock the cold water pipe 217 in place within the pipe receiving bay 776 as described above, and the cold water pipe 217 is now ready for operation.

It will be appreciated that guide wires, inflation lines, ballast lines and the like should remain unobstructed from each other during movement of the cold water pipe 217. Moreover, the movement of the cold water pipe 217 should not interfere with the mooring system of the spar 310.

Example 3: Methods of Use

An integrated multi-stage OTEC power plant can produce electricity using the temperature differential between the surface water and deep ocean water in tropical and subtropical regions. Aspects eliminate traditional piping runs for sea water by using the off-shore vessel's or platform's structure as a conduit or flow passage. Alternatively, the warm and cold sea water piping runs can use conduits or pipes of sufficient size and strength to provide vertical or other structural support to the vessel or platform. These integral sea water conduit sections or passages serve as structural members of the vessel, thereby reducing the requirements for additional steel. As part of the integral sea water passages, multi-stage cabinet heat exchangers provides multiple stages of working fluid evaporation without the need for external water nozzles or piping connections. The integrated multi-stage OTEC power plant allows the warm and cold sea water to flow in their natural directions. The warm sea water flows downward through the vessel as it is cooled before being discharged into a cooler zone of the ocean. In a similar fashion, the cold sea water from deep in the ocean flows upward through the vessel as it is warmed before discharging into a warmer zone of the ocean. This arrangement avoids the need for changes in sea water flow direction and associated pressure losses. The arrangement also reduces the pumping energy required.

Multi-stage cabinet heat exchangers allow for the use of a hybrid cascade OTEC cycle. These stacks of heat exchangers comprise multiple heat exchanger stages or sections that have sea water passing through them in series to boil or condense the working fluid as appropriate. In the evaporator section the warm sea water passes through the first stage where it boils off some of the working fluid as the sea water is cooled. The warm sea water then flows down the stack into the next heat exchanger stage and boils off additional working fluid at a slightly lower pressure and temperature. This occurs sequentially through the entire stack. Each stage or section of the cabinet heat exchanger supplies working fluid vapor to a dedicated turbine that generates electrical power. Each of the evaporator stages has a corresponding condenser stage at the exhaust of the turbine. The cold sea water passes through the condenser stacks in a reverse order to the evaporators.

Figure 19A:
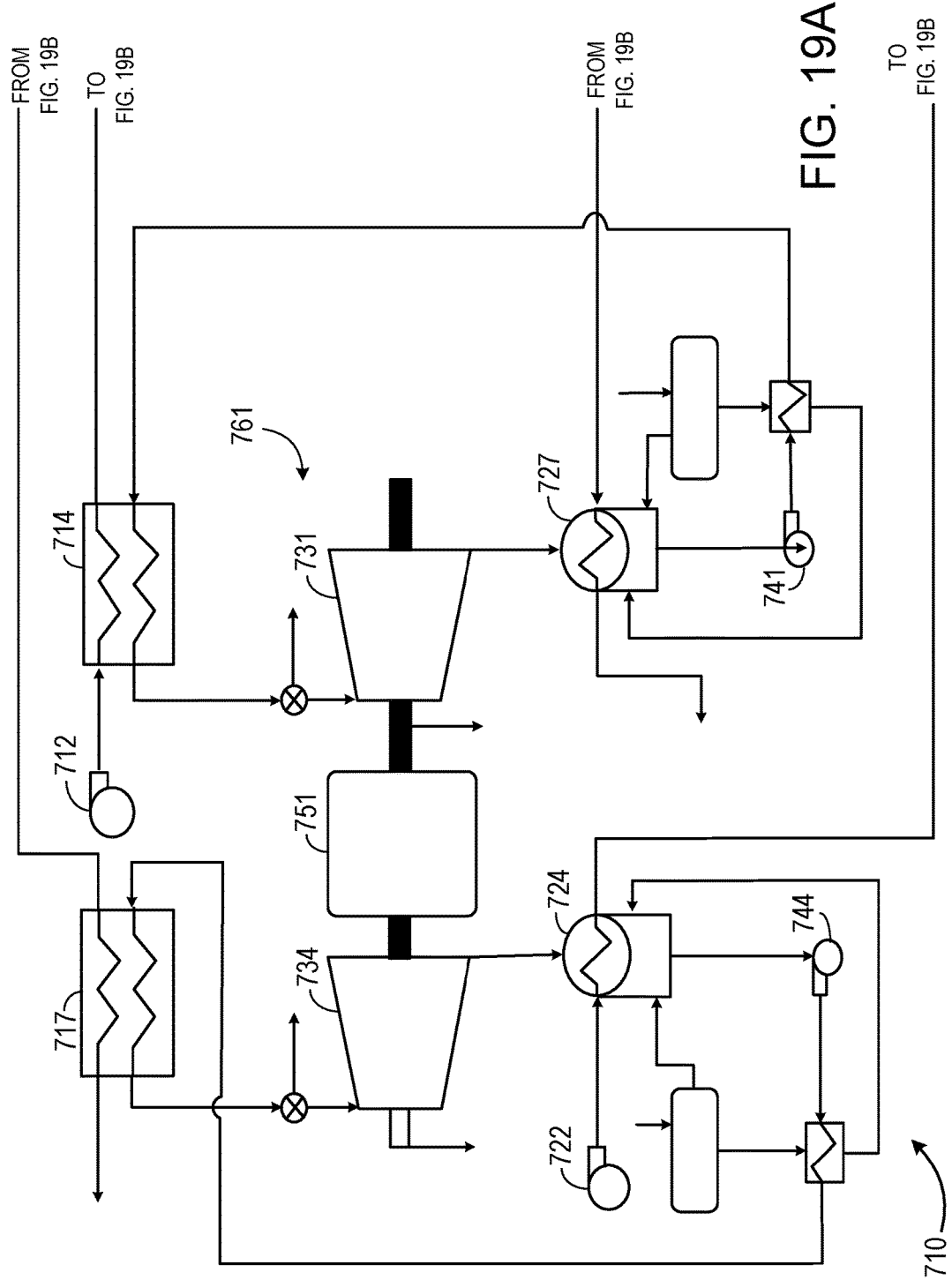
FIGS. 19A-19B illustrate an exemplary OTEC heat engine.
Figure 19B:
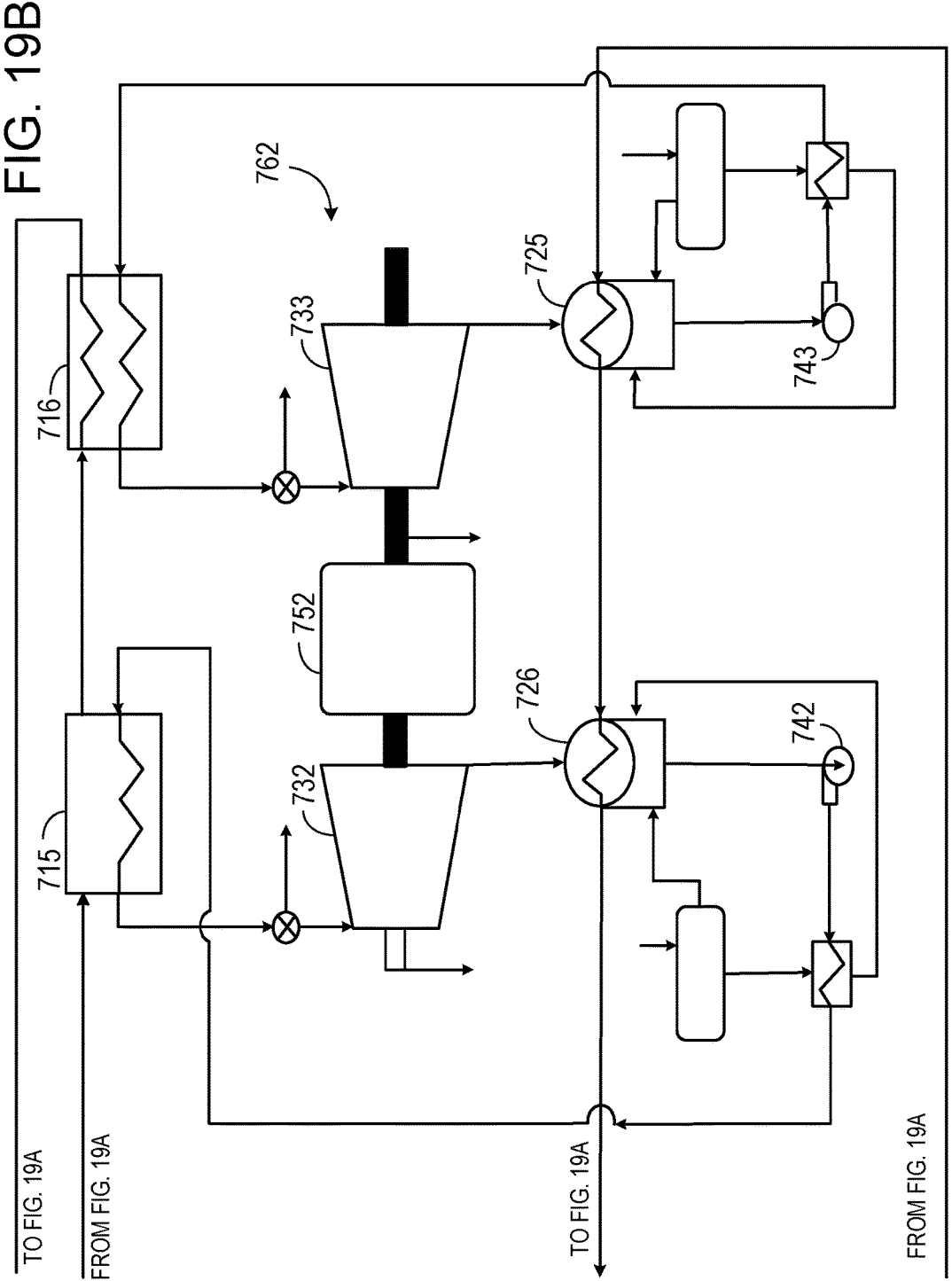

Referring to FIGS. 19A and 19B, an exemplary multi-stage OTEC heat engine 710 utilizing a hybrid cascading heat exchange cycles is provided. Warm sea water is pumped from a warm sea water intake (not shown) via warm water pump 712, discharging from the pump at approximately 1,360,000 gpm and at a temperature of approximately 79° F. All or parts of the warm water conduit from the warm water intake to the warm water pump, and from the warm water pump to the stacked heat exchanger cabinet can form integral structural members of the vessel.

From the warm water pump 712, the warm sea water then enters first stage evaporator 714 where it boils a first working fluid. The warm water exits first stage evaporator 714 at a temperature of approximately 76.8° F. and flows down to the second stage evaporator 715.

The warm water enters second stage evaporator 715 at approximately 76.8° F. where it boils a second working fluid and exits the second stage evaporator 715 at a temperature of approximately 74.5°.

The warm water flows down to the third stage evaporator 716 from the second stage evaporator 715, entering at a temperature of approximately 74.5° F., where it boils a third working fluid. The warm water exits the third stage evaporator 716 at a temperature of approximately 72.3° F.

The warm water then flows from the third stage evaporator 716 down to the fourth stage evaporator 717, entering at a temperature of approximately 72.3° F., where it boils a fourth working fluid. The warm water exits the fourth stage evaporator 717 at a temperature of approximately 70.1° F.

and then discharges from the vessel. Though not shown, the discharge can be directed to a thermal layer at an ocean depth of or approximately the same temperature as the discharge temperature of the warm sea water. Alternately, the portion of the power plant housing the multi-stage evaporator can be located at a depth within the structure so that the warm water is discharged to an appropriate ocean thermal layer. In aspects, the warm water conduit from the fourth stage evaporator to the warm water discharge of the vessel can comprise structural members of the vessel.

Similarly, cold sea water is pumped from a cold sea water intake (not shown) via cold sea water pump 722, discharging from the pump at approximately 855,003 gpm and at a temperature of approximately 40.0° F. The cold sea water is drawn from ocean depths of between approximately 2700 and 4200 ft, or more. The cold water conduit carrying cold sea water from the cold water intake of the vessel to the cold water pump, and from the cold water pump to the first stage condenser can comprise in its entirety or in part structural members of the vessel.

From cold sea water pump 722, the cold sea water enters a first stage condenser 724, where it condenses the fourth working fluid from the fourth stage boiler 717. The cold seawater exits the first stage condenser at a temperature of approximately 43.5° F. and flows up to the second stage condenser 725.

The cold sea water enters the second stage condenser 725 at approximately 43.5° F. where it condenses the third working fluid from third stage evaporator 716. The cold sea water exits the second stage condenser 725 at a temperature approximately 46.9° F. and flows up to the third stage condenser.

The cold sea water enters the third stage condenser 726 at a temperature of approximately 46.9° F. where it condenses the second working fluid from second stage evaporator 715. The cold sea water exits the third stage condenser 726 at a temperature approximately 50.4° F.

The cold sea water then flows up from the third stage condenser 726 to the fourth stage condenser 727, entering at a temperature of approximately 50.4° F. In the fourth stage condenser, the cold sea water condenses the first working fluid from first stage evaporator 714. The cold sea water then exits the fourth stage condenser at a temperature of approximately 54.0° F. and ultimately discharges from the vessel. The cold sea water discharge can be directed to a thermal layer at an ocean depth of or approximately the same temperature as the discharge temperature of the cold sea water. Alternately, the portion of the power plant housing the multi-stage condenser can be located at a depth within the structure so that the cold sea water is discharged to an appropriate ocean thermal layer.

The first working fluid enters the first stage evaporator 714 at a temperature of 56.7° F. where it is heated to a vapor with a temperature of 74.7° F. The first working fluid then flows to first turbine 731 and then to the fourth stage condenser 727 where the first working fluid is condensed to a liquid with a temperature of approximately 56.5° F. The liquid first working fluid is then pumped via first working fluid pump 741 back to the first stage evaporator 714.

The second working fluid enters the second stage evaporator 715 at a temperature approximately 53.0° F. where it is heated to a vapor. The second working fluid exits the second stage evaporator 715 at a temperature approximately 72.4° F. The second working fluid then flow to a second turbine 732 and then to the third stage condenser 726. The second working fluid exits the third stage condenser at a temperature approximately 53.0° F. and flows to working fluid pump 742, which in turn pumps the second working fluid back to the second stage evaporator 715.

The third working fluid enters the third stage evaporator 716 at a temperature approximately 49.5° F. where it will be heated to a vapor and exit the third stage evaporator 716 at a temperature of approximately 70.2° F. The third working fluid then flows to third turbine 733 and then to the second stage condenser 725 where the third working fluid is condensed to a fluid at a temperature approximately 49.5° F. The third working fluid exits the second stage condenser 725 and is pumped back to the third stage evaporator 716 via third working fluid pump 743.

The fourth working fluid enters the fourth stage evaporator 717 at a temperature of approximately 46.0° F. where it will be heated to a vapor. The fourth working fluid exits the fourth stage evaporator 717 at a temperature approximately 68.0° F. and flow to a fourth turbine 734. The fourth working fluid exits fourth turbine 734 and flows to the first stage condenser 724 where it is condensed to a liquid with a temperature approximately 46.0° F. The fourth working fluid exits the first stage condenser 724 and is pumped back to the fourth stage evaporator 717 via fourth working fluid pump 744.

The first turbine 731 and the fourth turbine 734 cooperatively drive a first generator 751 and form first turbo-generator pair 761. First turbo-generator pair will produce approximately 25 MW of electric power.

The second turbine 732 and the third turbine 733 cooperatively drive a second generator 752 and form second turbo-generator pair 762. Second turbo-generator pair 762 will produce approximately 25 MW of electric power.

The four stage hybrid cascade heat exchange cycle allows the maximum amount of energy to be extracted from the relatively low temperature differential between the warm sea water and the cold sea water. Moreover, all heat exchangers can directly support turbo-generator pairs that produce electricity using the same component turbines and generators.

It will be appreciated that multiple multi-stage hybrid cascading heat exchangers and turbo generator pairs can be incorporated into a vessel or platform design.

Power Modules and Heat Cycle

An offshore OTEC spar platform includes four separate power modules, each generating about 25 MWe Net at the rated design condition. Each power module comprises four separate power cycles or cascading thermodynamic stages that operate at different pressure and temperature levels and pick up heat from the sea water system in four different stages. The four different stages operate in series. The approximate pressure and temperature levels of the four stages at the rated design conditions (Full Load—Summer Conditions) are:

|  | Turbine inlet Pressure/Temp. (Psia)/(° F.) | Condenser Pressure/Temp. (Psia)/(° F.) |
|---|---|---|
| 1 Stage | 137.9/74.7 | 100.2/56.5 |
| 2" Stage | 132.5/72.4 | 93.7/53 |
| 3' Stage | 127.3/70.2 | 87.6/49.5 |
| 4" Stage | 122.4/68 | 81.9/46 |

The working fluid is boiled in multiple evaporators by picking up heat from warm sea water (WSW). Saturated vapor is separated in a vapor separator and led to an ammonia turbine by standard weight (STD) schedule, seamless carbon steel pipe. The liquid condensed in the condenser is pumped back to the evaporator by 2×100% electric motor driven constant speed feed pumps. The turbines of cycle-1 and 4 drive a common electric generator. Similarly the turbines of cycle-2 and 3 drive another common generator. In an aspect there are two generators in each plant module and a total of 8 in the 100 MWe plant. The feed to the evaporators is controlled by feed control valves to maintain the level in the vapor separator. The condenser level is controlled by cycle fluid make up control valves. The feed pump minimum flow is provided by recirculation lines led to the condenser through control valves regulated by the flow meter on the feed line.

In operation the four (4) power cycles of the modules operate independently. Any of the cycles can be shutdown without hampering operation of the other cycles if needed, for example in case of a fault or for maintenance. But that will reduce the net power generation of the power module as a whole module.

Aspects of the present systems and methods require large volumes of seawater. There will be separate systems for handling cold and warm seawater, each with its pumping equipment, water ducts, piping, valves, heat exchangers, etc. Seawater is more corrosive than fresh water and all materials that may come in contact with it need to be selected carefully considering this. The materials of construction for the major components of the seawater systems will be:

Large bore piping: Fiberglass Reinforced Plastic (FRP)

Large seawater ducts & chambers: Epoxy-coated carbon steel

Large bore valves: Rubber lined butterfly type

Pump impellers: Suitable bronze alloy

Unless controlled by suitable means, biological growths inside the seawater systems can cause significant loss of plant performance and can cause fouling of the heat transfer surfaces leading to lower outputs from the plant. This internal growth can also increase resistance to water flows causing greater pumping power requirements, lower system flows, etc. and even complete blockages of flow paths in more severe cases.

The Cold Sea Water ("CSW") system using water drawn in from deep ocean should have very little or no bio-fouling problems. Water in those depths does not receive much sunlight and lack oxygen, and so there are fewer living organisms in it. Some types of anaerobic bacteria may, however, be able to grow in it under some conditions. Shock chlorination will be used to combat bio-fouling.

The Warm Sea Water ("WSW") system handling warm seawater from near the surface will have to be protected from bio-fouling. It has been found that fouling rates are much lower in tropical open ocean waters suitable for OTEC operations than in coastal waters. As a result, chemical agents can be used to control bio-fouling in OTEC systems at very low doses that will be environmentally acceptable. Dosing of small amounts of chlorine has proved to be very effective in combating bio-fouling in seawater. Dosages of chlorine at the rate of about 70 ppb for one hour per day, is quite effective in preventing growth of marine organisms. This dosage rate is only 1/20th of the environmentally safe level stipulated by EPA. Other types of treatment (thermal shock, shock chlorination, other biocides, etc.) can be used from time to time in-between the regimes of the low dosage treatment to get rid of chlorine-resistant organisms.

Necessary chlorine for dosing the seawater streams is generated on-board the plant ship by electrolysis of seawater. Electro-chlorination plants of this type are available commercially and have been used successfully to produce hypochlorite solution to be used for dosing. The electro-chlorination plant can operate continuously to fill-up storage tanks and contents of these tanks are used for the periodic dosing described above.

All the seawater conduits avoid any dead pockets where sediments can deposit or organisms can settle to start a colony. Sluicing arrangements are provided from the low points of the water ducts to blow out the deposits that may get collected there. High points of the ducts and water chambers are vented to allow trapped gases to escape.

The Cold Seawater (CSW) system will consist of a common deep water intake for the plant ship, and water pumping/distribution systems, the condensers with their associated water piping, and discharge ducts for returning the water back to the sea. The cold water intake pipe extends down to a depth of more than 2700 ft, (e.g., between 2700 ft to 4200 ft), where the sea water temperature is approximately a constant 40° F. Entrance to the pipe is protected by screens to stop large organisms from being sucked in to it. After entering the pipe, cold water flows up towards the sea surface and is delivered to a cold well chamber near the bottom of the vessel or spar.

The CSW supply pumps, distribution ducts, condensers, etc. are located on the lowest level of the plant. The pumps take suction from the cross duct and send the cold water to the distribution duct system. 4×25% CSW supply pumps are provided for each module. Each pump is independently circuited with inlet valves so that they can be isolated and opened up for inspection, maintenance, etc. when required. The pumps are driven by high-efficiency electric motors.

The cold seawater flows through the condensers of the cycles in series and then the CSW effluent is discharged back to the sea. CSW flows through the condenser heat exchangers of the four plant cycles in series in the required order. The condenser installations is arranged to allow them to be isolated and opened up for cleaning and maintenance when needed.

The WSW system comprises underwater intake grills located below the sea surface, an intake plenum for conveying the incoming water to the pumps, water pumps, biocide dosing system to control fouling of the heat transfer surfaces, water straining system to prevent blockages by suspended materials, the evaporators with their associated water piping, and discharge ducts for returning the water back to the sea.

Intake grills are provided in the outside wall of the plant modules to draw in warm water from near the sea surface. Face velocity at the intake grills is kept to less than 0.5 ft/sec. to minimize entrainment of marine organisms. These grills also prevent entry of large floating debris and their clear openings are based on the maximum size of solids that can pass through the pumps and heat exchangers safely. After passing through these grills, water enters the intake plenum located behind the grills and is routed to the suctions of the WSW supply pumps.

The WSW pumps are located in two groups on opposite sides of the pump floor. Half of the pumps are located on each side with separate suction connections from the intake plenum for each group. This arrangement limits the maximum flow rate through any portion of the intake plenum to about 1/16th of the total flow and so reduces the friction losses in the intake system. Each of the pumps is provided with valves on inlet sides so that they can be isolated and opened up for inspection, maintenance, etc. when required. The pumps are driven by high-efficiency electric motors with variable frequency drives to match pump output to load.

It is necessary to control bio-fouling of the WSW system and particularly its heat transfer surfaces, and suitable biocides will be dosed at the suction of the pumps for this.

The warm water stream may need to be strained to remove the larger suspended particles that can block the narrow passages in the heat exchangers. Large automatic filters or 'Debris Filters' can be used for this if required. Suspended materials can be retained on screens and then removed by backwashing. The backwashing effluents carrying the suspended solids will be routed to the discharge stream of the plant to be returned to the ocean. The exact requirements for this will be decided during further development of the design after collection of more data regarding the seawater quality.

The strained warm seawater (WSW) is distributed to the evaporator heat exchangers. WSW flows through the evaporators of the four plant cycles in series in the required order. WSW effluent from the last cycle is discharged at a depth of approximately 175 feet or more below the sea surface. It then sinks slowly to a depth where temperature (and therefore density) of the seawater will match that of the effluent.

Though embodiments herein have described multi-stage heat exchanger in a floating offshore vessel or platform, drawing cold water via a continuous, offset staved cold water pipe, it will be appreciated that other embodiments are within the scope of the disclosure. For example, the cold water pipe can be connected to a shore facility. The continuous offset staved pipe can be used for other intake or discharge pipes having significant length to diameter ratios. The offset staved construction can be incorporated into pipe sections for use in traditional segmented pipe construction. The multi-stage heat exchanger and integrated flow passages can be incorporated into shore based facilities including shore based OTEC facilities. Moreover, the warm water can be warm fresh water, geo-thermally heated water, or industrial discharge water (e.g., discharged cooling water from a nuclear power plant or other industrial plant). The cold water can be cold fresh water. The OTEC system and components described herein can be used for electrical energy production or in other fields of use including: salt water desalination: water purification; deep water reclamation; aquaculture; the production of biomass or biofuels; and still other industries.

All references mentioned herein are incorporated by reference in their entirety.

Other embodiments are within the scope of the following claims.

What is claimed is:

1. A method of assembling a pipe on a water-supported floating platform that includes an open central bay, and a gantry on the platform arranged so as to surround at least a portion of the bay, the method comprising:
    providing a pipe intake assembly on the platform;
    providing staves;
    transferring the pipe intake assembly to an interior space of the bay;
    assembling individual staves on the pipe intake assembly in an offset stave construction so as to form an annular pipe portion having a crenellated upper end;
    lowering the pipe portion within the bay and into the water until the upper ends of the staves reside within a lower portion of the gantry;
    increasing a length of the pipe portion by assembling additional staves to the upper ends of the staves that form the pipe portion; and
    repeating the step of increasing the length of the portion of the pipe until the pipe has a desired length
    wherein the staves are individually packaged into a corresponding stave alignment jig.

2. The method of claim 1 wherein transferring the pipe intake assembly to the interior space of the bay includes lifting the pipe intake assembly above a surface of the platform; moving the platform so that the pipe intake assembly overlies the bay, and lowering the pipe intake assembly at least partially into the bay.

3. The method of claim 1 wherein transferring individual staves to the bay and assembling the individual staves on the pipe intake assembly further includes
    assembling the individual staves so that a lower end of the annular pipe portion is flush with an upper side of the pipe intake assembly; and
    joining the lower end of the annular pipe portion to the pipe intake assembly to form the pipe portion, wherein the step of joining includes wrapping a bonding material around a joint between the annular pipe portion and the pipe intake assembly, the bonding material extending circumferentially and overlapping at least a portion of the annular pipe portion and the pipe intake assembly.

4. The method of claim 1 wherein the pipe intake assembly includes a pipe end and a weight connected to the pipe end.

5. The method of claim 4, wherein the pipe end is tapered inward and is configured to be captured in a fitting provided on an underside of a spar.

6. The method of claim 1, further comprising the following step once the pipe has reached a desired length:
    connecting a pipe end to an end of the pipe that is opposed to the pipe intake assembly.

7. The method of claim 1, further wherein each stave alignment jig includes a lifting eye and a flange, the lifting eye disposed adjacent a first end of the stave alignment jig and the flange disposed adjacent a second end of the stave alignment jig and configured to cooperatively engage pins provided on the gantry.

8. The method of claim 1, further comprising providing at least one spreader within the pipe, wherein the spreader is configured to provide an outward force to an inner surface of the pipe.

9. The method of claim 1, wherein before adjacent staves are attached to each other, a bonding material is applied to each stave along a respective attachment surface.

10. The method of claim 9 wherein each stave comprises self-retaining mating features along edges that abut adjacent staves.

11. The method of claim 1, wherein each stave comprises self-retaining mating features along edges that abut adjacent staves.

* * * * *